(12) United States Patent
Banfi

(10) Patent No.: US 10,678,406 B1
(45) Date of Patent: Jun. 9, 2020

(54) CONVERSATIONAL USER INTERFACE DESIGN

(71) Applicant: Botsociety, Inc., San Francisco, CA (US)

(72) Inventor: Vittorio Banfi, Milan (IT)

(73) Assignee: Botsociety, Inc., San Francisco, CA (US)

(*) Notice: Subject to any disclaimer, the term of this patent is extended or adjusted under 35 U.S.C. 154(b) by 0 days.

(21) Appl. No.: 16/268,342

(22) Filed: Feb. 5, 2019

Related U.S. Application Data

(60) Provisional application No. 62/626,504, filed on Feb. 5, 2018.

(51) Int. Cl.
*G06F 3/0484* (2013.01)
*G06F 9/451* (2018.01)

(52) U.S. Cl.
CPC ............ *G06F 3/0484* (2013.01); *G06F 9/453* (2018.02)

(58) Field of Classification Search
CPC .................................................... G06F 3/0484
USPC ......................................................... 715/706
See application file for complete search history.

(56) References Cited

U.S. PATENT DOCUMENTS

| | | | | |
|---|---|---|---|---|
| 10,462,243 B2* | 10/2019 | Li | ........................ | H04L 67/22 |
| 2015/0295872 A1* | 10/2015 | Hawryluk | ........... | G06F 21/6245 |
| | | | | 715/752 |
| 2017/0090737 A1* | 3/2017 | Harvey | ................ | G06F 11/321 |
| 2017/0289305 A1* | 10/2017 | Liensberger | ............ | H04L 67/02 |
| 2018/0270183 A1* | 9/2018 | Wei | ...................... | H04L 51/046 |
| 2018/0293983 A1* | 10/2018 | Choi | ....................... | G10L 15/22 |
| 2019/0138600 A1* | 5/2019 | Krishnan | ............. | G06F 3/0484 |
| 2019/0179502 A1* | 6/2019 | Tokuchi | ................ | G06F 3/0488 |
| 2019/0213284 A1* | 7/2019 | Anand | .................. | G06F 3/0484 |

OTHER PUBLICATIONS

Botsify—Create AI Chatbot Without Coding. (Jan. 8, 2018). Retrieved Jan. 23, 2019, from http://web.archive.org/web/20180108213215/https://botsify.com/, 3 pgs.
Chatfuel. Build a Facebook bot without coding. (Jan. 5, 2018). Retrieved Jan. 23, 2019, from http://web.archive.org/web/20180105173449/http://chaffuel.com, 5 pgs.
(Continued)

Primary Examiner — William D Titcomb
(74) Attorney, Agent, or Firm — Patent Law Works LLP

(57) ABSTRACT

A system and method for designing a conversational interface is disclosed. The method includes displaying a first portion of a conversational interface editor, receiving user interaction in the first portion defining a first message object attributed to a first conversational entity, displaying a second portion of the conversational interface editor, receiving user interaction in the second portion defining a second message object attributed to a second conversational entity, and displaying a third portion of the conversational interface editor, the third portion arranging the first message object and the second message object to depict a structure of a conversational interaction between the first conversational entity and the second conversational entity in a conversational interface.

20 Claims, 39 Drawing Sheets

(56) References Cited

OTHER PUBLICATIONS

Google Developers, UI toolkit | Actions on Google. (n.d.). Retrieved Jan. 23, 2019, from https://developers.google.com/actions/design/ui-toolkit, 3 pgs.

Gupshup. Gupshup—Automate your conversations quickly and easily. Website. (Dec. 22, 2017) Retrieved Jan. 23, 2019, from http://web.archive.org/web/20171222215551/http://www.gupshup.io/developer/bot-builder-tools, 3 pgs.

Motion AI—Chatbots made easy. Website. (Sep. 20, 2017) Retrieved Jan. 23, 2019, from http://web.archive.org/web/20170920102251/https://www.motion.ai/, 3 pgs.

Overview—Visual components—Conversation design. Website. Retrieved Jan. 23, 2019, from https://designguidelines.withgoogle.com/conversation/visual-components/overview.html#overview-types-of-visual-components, 4 pgs.

Scale your design—Conversation design process—Conversation design. Website. Retrieved Jan. 23, 2019, from https://designguidelines.withgoogle.com/conversation/conversation-design-process/scale-your-design.html#scale-your-design-anatomy-of-a-response, 10 pgs.

\* cited by examiner

CONVERSATIONAL USER INTERFACE DESIGN

CROSS REFERENCE TO RELATED APPLICATIONS

The present application claims priority, under 35 U.S.C. § 119, of U.S. Provisional Patent Application No. 62/626,504, filed Feb. 5, 2018 and entitled "Conversational User Interface Design," which is incorporated by reference in its entirety.

BACKGROUND

The specification generally relates to designing conversational user interfaces or conversational interfaces (CUI). In particular, the specification relates to a system and method for displaying a conversational interface editor for interactively designing, prototyping, and previewing the conversational interfaces.

Conversational interfaces have increasingly been adopted by businesses as a tool to efficiently provide consumers with information by mimicking a conversation with a real human. Conversational interfaces allow consumers to converse in natural language to engage and interact with the front end of a technology. As such, conversational interfaces provide ease of access to relevant and contextual information needed by the consumer. It is important to design a conversational interface before a software developer can build and implement it. If the conversational interface is not designed beforehand, the consumer may end with a user experience that is not suitable for conversation. Designing a conversational interface allows for a faster, more effective development process, helps to improve the user experience and achieve a desired business goal. However, conversational interfaces are difficult to design. Previous attempts at designing the conversational interfaces have deficiencies. For example, one method is to design a conversational interface by modifying or redesigning a graphical user interface (GUI). This is problematic because the user interaction in a conversational interface may take place in the form of text or voice or a mixture of both, which is fundamentally different from user interaction through a GUI.

SUMMARY

According to one innovative aspect of the subject matter described in this disclosure, a computer-implemented method comprises: displaying a first portion of a conversational interface editor on a client device to a user, the first portion including a first plurality of user-selectable formats for defining a first message object; receiving user interaction in the first portion that defines the first message object in association with a first format of the first plurality of user-selectable formats, the first message object attributed to a first conversational entity; displaying a second portion of the conversational interface editor on the client device to the user, the second portion including a second plurality of user-selectable formats for defining a second message object; receiving user interaction in the second portion that defines the second message object in association with a second format of the second plurality of user-selectable formats, the second message object attributed to a second conversational entity; and displaying a third portion of the conversational interface editor on the client device to the user, the third portion arranging the first message object and the second message object to depict a structure of a conversational interaction between the first conversational entity and the second conversational entity in a conversational interface responsive to receiving the user interaction in the first portion and the second portion.

In general, another innovative aspect of the subject matter described in this disclosure may be embodied in systems comprising: one or more processors; a memory storing instructions, which when executed cause the one or more processors to: display a first portion of a conversational interface editor on a client device to a user, the first portion including a first plurality of user-selectable formats for defining a first message object; receive user interaction in the first portion that defines the first message object in association with a first format of the first plurality of user-selectable formats, the first message object attributed to a first conversational entity; display a second portion of the conversational interface editor on the client device to the user, the second portion including a second plurality of user-selectable formats for defining a second message object; receive user interaction in the second portion that defines the second message object in association with a second format of the second plurality of user-selectable formats, the second message object attributed to a second conversational entity; and display a third portion of the conversational interface editor on the client device to the user, the third portion arranging the first message object and the second message object to depict a structure of a conversational interaction between the first conversational entity and the second conversational entity in a conversational interface responsive to receiving the user interaction in the first portion and the second portion.

Other implementations of one or more of these aspects include corresponding methods, systems, apparatuses, and computer program products, configured to perform the actions of the methods, encoded on computer storage devices.

These and other implementations may each optionally include one or more of the following operations. For instance, another aspect of the subject matter of this disclosure may be embodied in methods that include receiving user selection for designing a type of conversational interface; responsive to receiving the user selection, generating the conversational interface editor for displaying on the client device to the user, the conversational interface editor matching the type of conversational interface selected for designing; displaying a fourth portion of the conversational interface editor on the client device to the user, the fourth portion including a plurality of user-selectable graphical elements for interacting with a design of the conversational interface; receiving user interaction in the fourth portion selecting a first user-selectable graphical element to request a preview of the conversational interaction; responsive to receiving the user interaction in the fourth portion selecting the first user-selectable graphical element, previewing a flow of the conversational interaction between the first conversational entity and the second conversational entity in the conversational interface depicted in the third portion; receiving user interaction in the fourth portion selecting a second user-selectable graphical element to request a visualization of the flow of the conversational interaction; responsive to receiving the user interaction in the fourth portion selecting the second user-selectable graphical element; displaying a fifth portion of the conversational interface editor on the client device to the user, the fifth portion depicting the visualization; receiving user interaction in the third portion associated with manipulating one or more of the first message object and the second message object; responsive to receiving the user interaction in the third portion, updating the visualization of the flow of the conversational interaction; receiving user interaction in the third portion associated with creating a new path of the conversational interaction; displaying a sixth portion of the conversational interface editor on the client device to the user, the sixth portion depicting the new path of the conversational interaction responsive to receiving the user interaction in the first portion and the second portion; and automatically linking the new path to a last message object of the first message object and the second message object in the third portion.

These and other implementations may each optionally include one or more of the following features. For instance, the features may further include one of the first format and the second format being a device format from a group of smart speaker, headphones, smart display, television, laptop, smartphone, and smartwatch; one of the first format and the second format being a message format from a group of audio, textual, speech synthesis markup language object, image, text, lists, buttons, cards, suggestions, and carousel; the first portion of the conversational interface editor being inlaid within the third portion of the conversational interface editor responsive to receiving the user interaction in the first portion; the second portion of the conversational interface editor being inlaid within the third portion of the conversational interface editor responsive to receiving the user interaction in the second portion; type of conversational interface being one from a group of text-based conversational interface, voice-based conversational interface, and image-based conversational interface; and manipulating the one or more of the first message object and the second message object comprising one from a group of moving, reordering, editing, deleting, cloning, and creating a new path.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

The technology disclosed in this application allows, among other things, users to create, prototype, and preview a design of a conversational interface. Conversational interfaces employ a conversation in natural language as the main interaction between a user and a software agent. In some embodiments, the conversational interface may be designed for an existing technology platform. For example, a user may design a conversational interface (e.g., a chatbot) for a messaging application. In some embodiments, the conversational interface may be designed for a particular device to take advantage of the capabilities present in the device. For example, a user may design a conversational interface (e.g., a virtual assistant) for a smart speaker device. Furthermore, users may collaborate with others by sharing the conversational interface for viewing, editing, and/or annotating, etc. The technology may include various systems, methods, computer program products, interfaces, and other aspects to provide these and other advantages, acts, and/or functionality.

Figure 1:
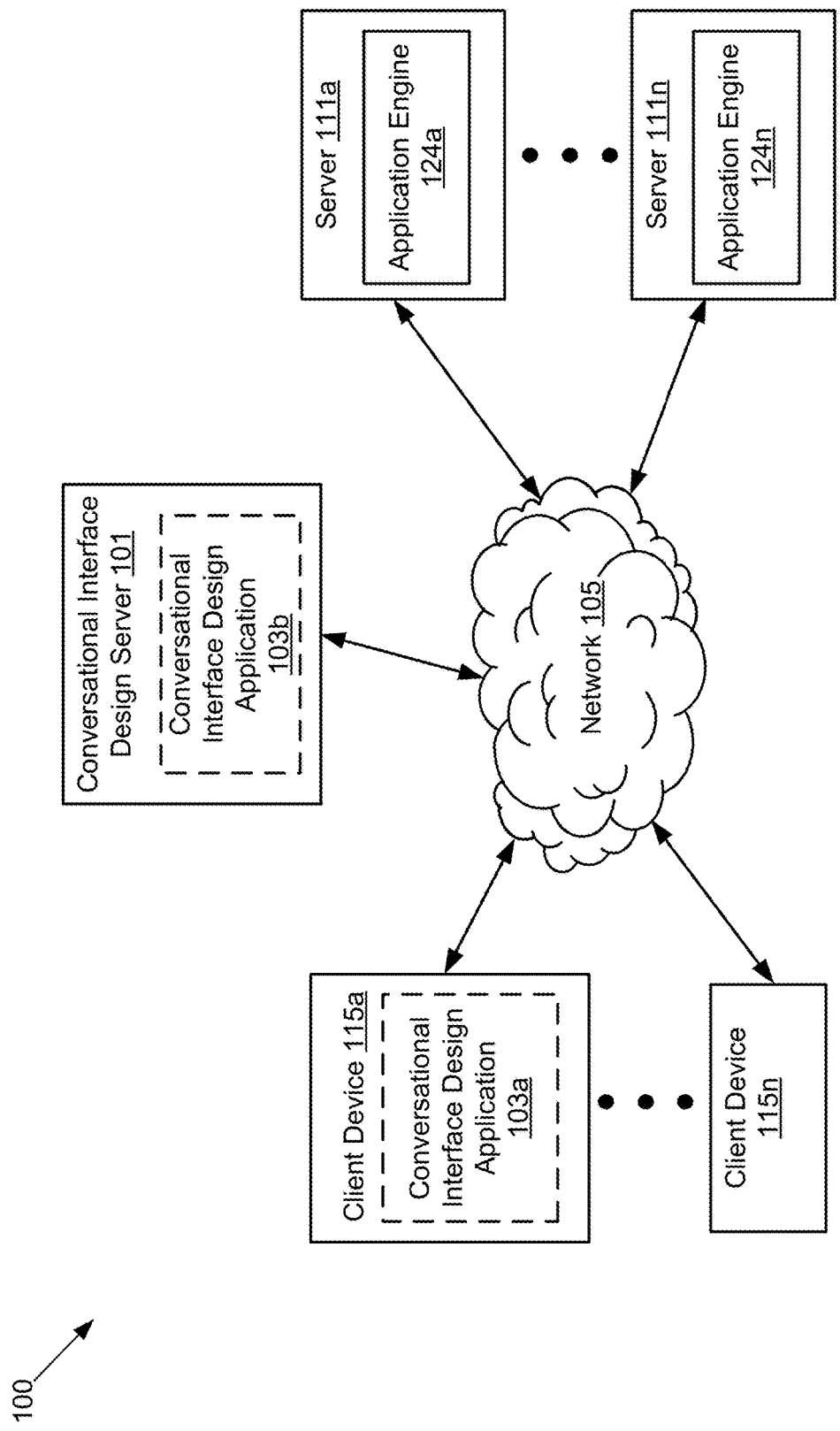
FIG. 1 is a high-level block diagram illustrating one embodiment of a system for designing, prototyping, and previewing a conversational interface.

FIG. 1 is a high-level block diagram illustrating one embodiment of a system 100 for designing, prototyping, and previewing a conversational interface. The illustrated system 100 may include client devices 115a . . . 115n, a conversational interface design server 101, and servers 111a . . . 111n, which are communicatively coupled via a network 105 for interaction with one another. The client devices 115a . . . 115n may be accessed by users to design the conversational interfaces. In FIG. 1 and the remaining figures, a letter after a reference number, e.g., "115a," represents a reference to the element having that particular reference number. A reference number in the text without a following letter, e.g., "115," represents a general reference to instances of the element bearing that reference number.

The network 105 can be a conventional type, wired or wireless, and may have numerous different configurations including a star configuration, token ring configuration, or other configurations. Furthermore, the network 105 may include any number of networks and/or network types. For example, the network 105 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, and/or other interconnected data paths across which multiple devices may communicate, various combinations thereof, etc. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. In some embodiments, the data transmitted by the network 105 may include packetized data (e.g., Internet Protocol (IP) data packets) that is routed to designated computing devices coupled to the network 105. Although FIG. 1 illustrates one network 105 coupled to the client devices 115 and the conversational interface design server 101, in practice one or more networks 105 can be connected to these entities.

The client device 115a . . . 115n (also referred to individually and collectively as 115) may be computing devices having data processing and communication capabilities. In some implementations, a client device 115 may include a memory, a processor (e.g., virtual, physical, etc.), a power source, a network interface, software and/or hardware components, such as a display, graphics processor unit (GPU), wireless transceivers, keyboard, camera (e.g., webcam), sensors, firmware, operating systems, web browsers, applications, drivers, and various physical connection interfaces (e.g., USB, HDMI, etc.). The client devices 115a . . . 115n may couple to and communicate with one another and the other entities of the system 100 via the network 105 using a wireless and/or wired connection. Examples of client devices 115 may include, but are not limited to, laptops, desktops, tablets, mobile phones (e.g., smartphones, features phones, etc.), server appliances, servers, virtual machines, smart TVs, media streaming devices, user wearable computing devices or any other electronic device capable of accessing a network 105. While two or more client devices 115 are depicted in FIG. 1, the system 100 may include any number of client devices 115. In addition, the client devices 115a . . . 115n may be the same or different types of computing devices. In the example implementation of FIG. 1, the client device 115a is configured to implement a conversational interface design application 103a.

The conversational interface design server 101 and the servers 111a . . . 111n may include one or more computing devices having data processing, storing and network communication capabilities. For example, these entities 101 and 111 may include one or more hardware servers, virtual servers, server arrays, storage devices and/or systems, etc., and/or may be centralized or distributed/cloud-based. In some implementations, these entities 101 and/or 111 may include one or more virtual servers, which operate in a host server environment and access the physical hardware of the host server including, for example, a processor, a memory, applications, a database, storage, network interfaces, etc., via an abstraction layer (e.g., a virtual machine manager).

In the example of FIG. 1, the conversational interface design server 101 is configured to implement a conversational interface design application 103b. The conversational interface design server 101 may be operable to receive, store, and/or manage the conversational interface designs created by the users, enable the users to create and manage user accounts, share and/or export the conversational interface designs created by users, collaborate in the conversational interface design process, receive annotations on the conversational interface designs from other users as appropriate, etc. The conversational interface design server 101 may send data to and receive data from the other entities of the system 100 including the client devices 115 and servers 111 via the network 105. It should be understood that the conversational interface design server 101 is not limited to providing the above-noted acts and/or functionality and may include other network-accessible services. In addition, while a single conversational interface design server 101 is depicted in FIG. 1, it should be understood that there may be any number of conversational interface design servers 101 or a server cluster.

The servers 111a . . . 111n (also referred to individually and collectively as 111), as depicted, respectively include application engines 124a . . . 124n (also referred to individually and collectively as 124). An application engine 124 may include software, logic, and/or routines operable by a server 111 to provide various services such as chatbot development platforms; social networking; email; blogging; micro-blogging; photo management; video, multimedia hosting, distribution, and sharing; cloud-based data storage and sharing; a combination of one or more of the foregoing services; or any other service where users retrieve, collaborate, and/or share information.

The conversational interface design application 103 may include software and/or logic to provide the functionality for designing a conversational interface. In some embodiments, the conversational interface design application 103 can be implemented using programmable or specialized hardware, such as a field-programmable gate array (FPGA) or an application-specific integrated circuit (ASIC). In some embodiments, the conversational interface design application 103 can be implemented using a combination of hardware and software. In other embodiments, the conversational interface design application 103 may be stored and executed on a combination of the client devices 115 and the conversational interface design server 101, or by any one of the client devices 115 or the conversational interface design server 101.

In some embodiments, the conversational interface design application 103a may be a thin-client application with some functionality executed on the client device 115 and additional functionality executed on the conversational interface design server 101 by the conversational interface design application 103b. For example, the conversational interface design application 103a on the client device 115 may be storable in a memory (e.g., see FIG. 2) and executable by a processor (e.g., see FIG. 2) of the client device 115 to provide for user interaction, receive user input, present information (e.g., a preview of an interaction on conversational interfaces) to the user via a display (e.g., see FIG. 2), and send data to and receive data from the other entities of the system 100 via the network 105. The conversational interface design application 103a may be operable to allow users to create conversational interface designs, share their creations using services embodied by the application engines 124, collaborate on their creations with others, access, reuse, and iterate the conversational interface designs of others, etc. In another example, the conversational interface design application 103b on the conversational interface design server 101 could include software and/or logic for generating a visualization (e.g., flowchart, decision tree, etc.) of a conversational interaction in a conversational interface, storing and exporting of the design of the conversational interface, etc.

In some embodiments, the conversational interface design application 103 may generate and present various user interfaces to perform these acts and/or functionality, which may in some cases be based at least in part on information received from the conversational interface design server 101, the client device 115, and/or one or more of the servers 111 via the network 105. Non-limiting example user interfaces that may be generated for display by the conversational interface design application 103 are depicted in FIGS. 3A-3D, 4A-4B, 5A-5F, 7A-7C, 8A-8B, 9, 10A-10H, and 11. In some embodiments, the conversational interface design application 103 is code operable in a web browser, a web application accessible via a web browser, a native application (e.g., mobile application, installed application, etc.), a combination thereof, etc. Additional structure, acts, and/or functionality of the conversational interface design application 103 is further discussed below with reference to at least FIG. 2.

In some embodiments, the conversational interface design application 103 may require users to be registered with the conversational interface design server 101 to access the acts and/or functionality described herein. For example, to access various acts and/or functionality provided by the conversational interface design application 103, the conversational interface design application 103 may require a user to authenticate his/her identity. For example, the conversational interface design application 103 may require a user seeking access to authenticate their identity by inputting credentials in an associated user interface. In another example, the conversational interface design application 103 may interact with a federated identity server (not shown) to register and/or authenticate the user.

It should be understood that the system 100 illustrated in FIG. 1 is representative of an example system for conversational interface design, and that a variety of different system environments and configurations are contemplated and are within the scope of the present disclosure. For instance, various functionality may be moved from a server to a client device, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
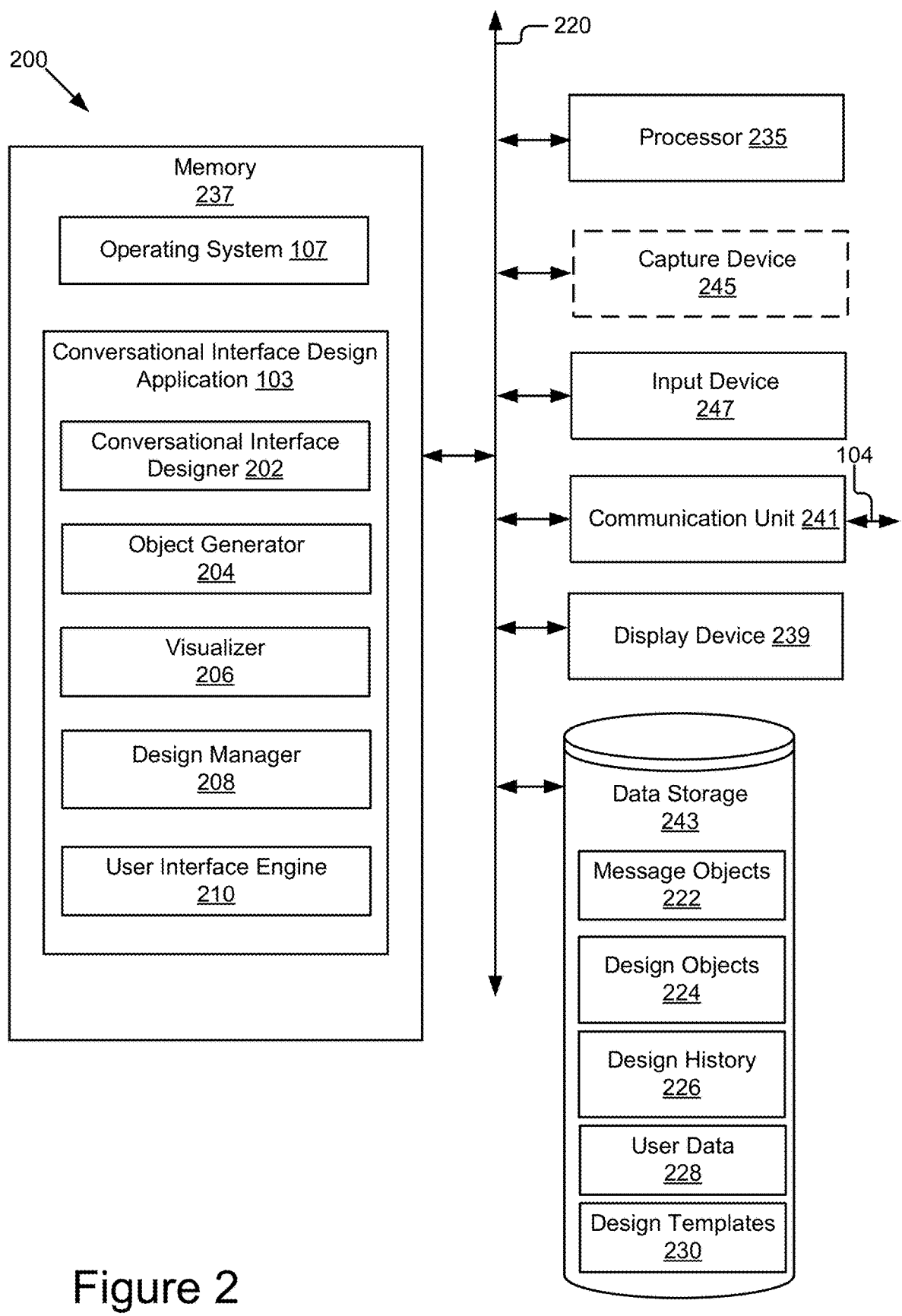
FIG. 2 is a block diagram illustrating one embodiment of a computing device including a conversational interface design application.

FIG. 2 is a block diagram illustrating one embodiment of a computing device 200 including a conversational interface design application 103. The computing device 200 may also include a processor 235, a memory 237, a display device 239, a communication unit 241, an optional capture device 245, an input device 247, and a data storage 243, according to some examples. The components of the computing device 200 are communicatively coupled by a bus 220. In some embodiments, the computing device 200 may be representative of the client device 115, the conversational interface design server 101, or a combination of the client device 115 and the conversational interface design server 101. In such embodiments where the computing device 200 is the client device 115 or the conversational interface design server 101, it should be understood that the client device 115 and the conversational interface design server 101 may take other forms and include additional or fewer components without departing from the scope of the present disclosure. For example, while not shown, the computing device 200 may include sensors, additional processors, and other physical configurations. Additionally, it should be understood that the computer architecture depicted in FIG. 2 could be applied to other entities of the system 100 with various modifications, including, for example, the servers 111.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device 239, supporting the display of images, capturing and transmitting images, and performing complex tasks including various types of feature extraction and sampling. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the display device 239, the input device 247, and the data storage 243. It will be apparent to one skilled in the art that other processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, as depicted in FIG. 2, the memory 237 may store the conversational interface design application 103. The memory 237 is also capable of storing other instructions and data, including, for example, an operating system 107, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The bus 220 may represent one or more buses including an industry standard architecture (ISA) bus, a peripheral component interconnect (PCI) bus, a universal serial bus (USB), or some other bus providing similar functionality. The bus 220 can include a communication bus for transferring data between components of the computing device 200 or between computing device 200 and other components of the system 100 via the network 105 or portions thereof, a processor mesh, a combination thereof, etc. In some implementations, the conversational interface design application 103 and various other software operating on the computing device 200 (e.g., an operating system 107, device drivers, etc.) may cooperate and communicate via a software communication mechanism implemented in association with the bus 220. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The display device 239 may be any conventional display device, monitor or screen, including but not limited to, a liquid crystal display (LCD), light emitting diode (LED), organic light-emitting diode (OLED) display or any other similarly equipped display device, screen or monitor. The display device 239 represents any device equipped to display user interfaces, electronic images, and data as described herein. The display device 239 is coupled to the bus 220 for communication with the processor 235 and the other components of the computing device 200. In some implementations, the display device 239 may be a touch-screen display capable of receiving input from one or more fingers of a user. For example, the display device 239 may be a capacitive touch-screen display capable of detecting and interpreting multiple points of contact with the display surface. In some implementations, the computing device 200 (e.g., client device 115) may include a graphics adapter (not shown) for rendering and outputting the images and data for presentation on display device 239. The graphics adapter (not shown) may be a separate processing device including a separate processor and memory (not shown) or may be integrated with the processor 235 and memory 237.

The input device 247 may include any device for inputting information into the computing device 200. In some implementations, the input device 247 may include one or more peripheral devices. For example, the input device 247 may include a keyboard (e.g., a QWERTY keyboard), a pointing device (e.g., a mouse or touchpad), microphone, an image/video capture device (e.g., camera), etc. In some implementations, the input device 247 may include a touch-screen display capable of receiving input from the one or more fingers of the user. For instance, the functionality of the input device 247 and the display 239 may be integrated, and a user of the computing device 200 (e.g., client device 115) may interact with the computing device 200 by contacting a surface of the display device 239 using one or more fingers. In this example, the user can interact with an emulated (i.e., virtual or soft) keyboard displayed on the touch-screen display device 239 by using fingers to contact the display in the keyboard regions.

The capture device 245 is a digital image capture device capable of capturing still and motion images, and sound. An example of the capture device 245 is a digital camera. The capture device 245 is coupled to the bus 220 for communication and interaction with the other components of the computing device 200, and these components may interface with the capture device 245 (e.g., via a software driver executable by the processor 235) via the bus 220 to capture still and/or motion images (e.g., videos and photographs) using the capture device 245 and provide the images and other processed metadata to the processor 235, the memory 237, or the data storage 243. It should be noted that the capture device 245 is shown in FIG. 2 with dashed lines to indicate it is optional. For example, in the instance where the computing device 200 is the conversational interface design server 101, the capture device 245 may not be part of the system. In the instance where the computing device 200 is the client device 115, the capture device 245 may be included.

The communication unit 241 is hardware for receiving and transmitting data by linking the processor 235 to the network 105 and other processing systems via signal line 104. The communication unit 241 receives data such as requests from the client device 115 and transmits the requests to the conversational interface design application 103, for example a request to create a conversational user interface. The communication unit 241 also transmits information including the conversational interface to the client device 115 for display, for example, in response to creating the conversational interface. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. In some embodiments, the data storage 243 may be coupled to the components 235, 237, 239, 241, 245, and 247 via the bus 220 to receive and provide access to data. In some embodiments, the data storage 243 may store data received from other elements of the system 100 include, for example, the application engines 124 and/or the conversational interface design applications 103, and may provide data access to these entities. The data storage 243 may store, among other data, message objects 222, design objects 224, design history 226, user data 228, and design templates 230. The message objects 222 represent the messages attributed to conversational entities in conversational interface designs. The design objects 224 represent the conversational interface designs curated by the users. The user data 228 includes user profiles and settings. The design history 226 includes the creation, revision, and annotation history for the conversational interface designs. The design history 226 may also include visualization data for depicting the flow of the conversational interaction in the designs. The design templates 230 include style sheet templates for various types of conversational interfaces.

The data storage 243 may be included in the computing device 200 or in another computing device and/or storage system distinct from but coupled to or accessible by the computing device 200. The data storage 243 can include one or more non-transitory computer-readable mediums for storing the data. In some embodiments, the data storage 243 may be incorporated with the memory 237 or may be distinct therefrom. The data storage 243 may be a dynamic random access memory (DRAM) device, a static random access memory (SRAM) device, flash memory, or some other memory devices. In some embodiments, the data storage 243 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other embodiments, the data storage 243 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis.

As depicted in FIG. 2, the conversational interface design application 103 may include a conversational interface designer 202, an object generator 204, a visualizer 206, a design manager 208, and a user interface engine 210. The components 202, 204, 206, 208, and 210 may be communicatively coupled by the bus 220 and/or the processor 235 to one another and/or the other components 237, 239, 241, 243, 245, and 247 of the computing device 200. The components 202, 204, 206, 208, and 210 may each include software and/or logic to provide their respective functionality. In some embodiments, the components 202, 204, 206, 208, and 210 can each be implemented using programmable or specialized hardware including a field-programmable gate array (FPGA) or an application-specific integrated circuit (ASIC). In some embodiments, the components 202, 204, 206, 208, and 210 can each be implemented using a combination of hardware and software executable by the processor 235. In some embodiments, the components 202, 204, 206, 208, and 210 may each be stored in the memory 237 and be accessible and executable by the processor 235 to provide their acts and/or functionality. In some embodiments, one or more of the components 202, 204, 206, 208, and 210 are sets of instructions executable by the processor 235 to provide their acts and/or functionality. In some embodiments, the components 202, 204, 206, 208, and 210 may each be adapted for cooperation and communication with the processor 235, the memory 237, and with each other via the bus 220. In some embodiments, the components 202, 204, 206, 208, and 210 may send and receive data, via the communication unit 241, to and from one or more of the client devices 115, the conversational interface design server 101 and servers 111.

The conversational interface designer 202 may include software and/or logic to provide functionality for designing, prototyping, and previewing conversational interfaces. The conversational interface designer 202 enables a user to curate, compose, and edit an interaction for a conversational interface. A conversational interface may conduct a conversation with a user, either via voice or inside a chat user interface and it can be designed to accomplish a specific business goal, while being able to carry the conversation in a human-like manner. By designing an interaction in a conversational interface, the user may informally experiment with and evaluate different design strategies, and receive insight into whether the conversational interface will work for consumers before programming the conversational interface. The conversational interface designer 202 enables the user to interactively define a flow of the conversation between two or more conversational entities and build the underlying logic for the user experience. An interaction via a conversational interface may take place in the form of text (e.g., chatbots) or voice (e.g., virtual assistants, smart speakers, etc.) or a mixture of both. In some embodiments, the user may access a user interface associated with the conversational interface designer 202 for designing, prototyping, and previewing a conversational interface. For example, the user interface may be a WYSIWYG editor for conversational interface that allows the user to see what the conversational interaction will look and/or sound like in the design of the conversational interface. In some embodiments, the conversational interface designer 202 may request existing designs of conversational interface created by or shared with a user from the data storage 243.

Figure 3A:
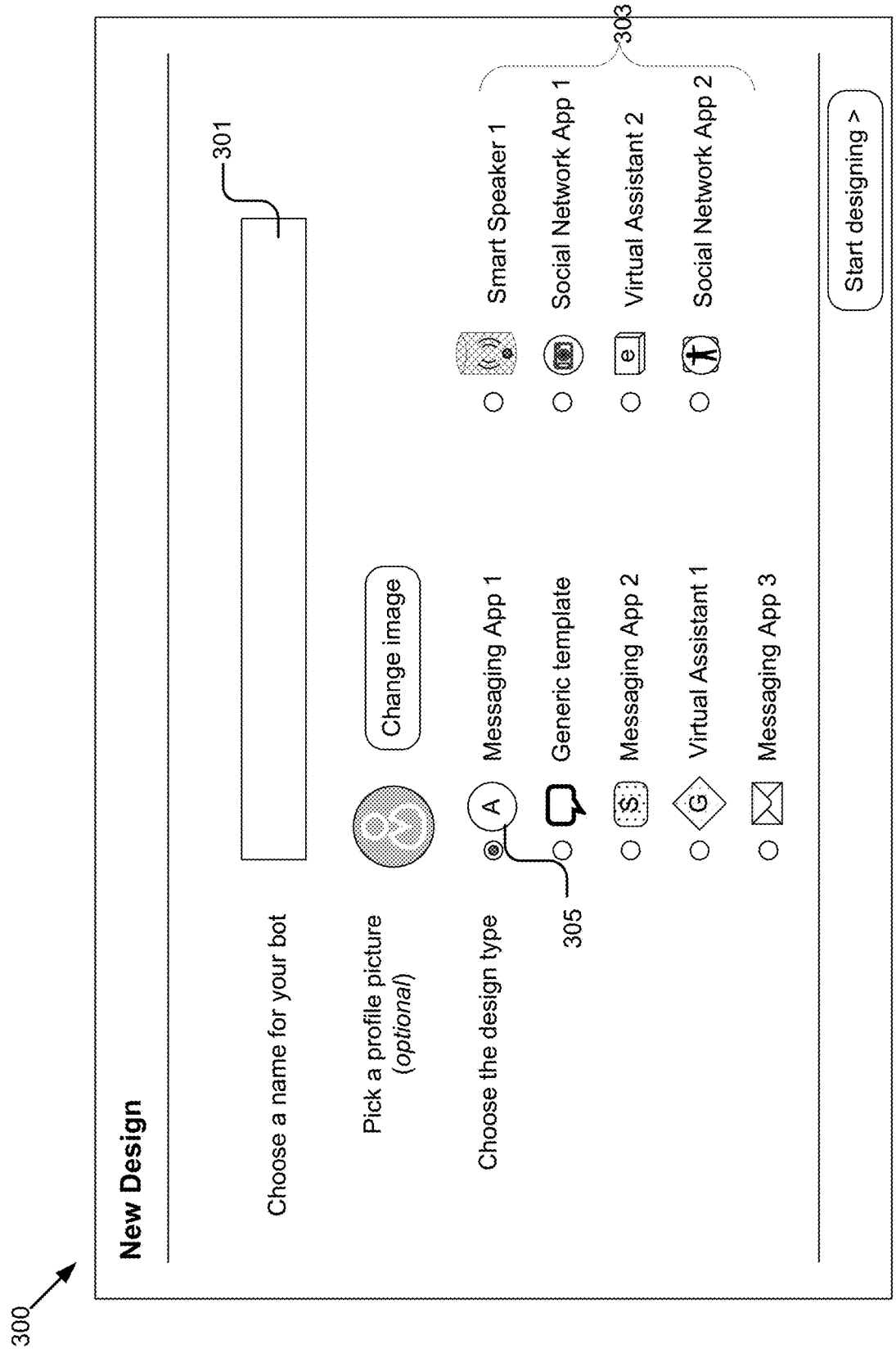
FIGS. 3A-3D show example graphical representations illustrating user interfaces for designing a conversational interface for a technology platform.

In some embodiments, the conversational interface designer 202 receives a user selection of a type of conversational interface to design. For example, the user may select to design a voice-based conversational interface, a text-based conversational interface, an image-based conversational interface, or a mixture. FIGS. 3A-3D show example graphical representations illustrating user interfaces for designing a conversational interface for a technology platform. In FIG. 3A, the user interface 300 depicts a home page for designing a conversational interface. The home page includes a name field 301 where the user can enter a name for a conversational interface design. The home page also includes a list 303 of technology platforms for the user to select. A conversational interface may be designed to be accessed via an existing technology platform or service. For example, the types of platforms may include messaging applications, social networking applications, smart speakers, virtual assistants, e-commerce, websites, etc. In FIG. 3A, the platform "Messaging App 1" 305 is shown as being selected by the user. The user may also select a generic platform that abstracts away the characteristics of existing technology platforms. In this way, the user may design a general structure of an interaction for a conversational interface without regard for adherence to style guidelines and other requirements of existing technology platforms.

Figure 3B:
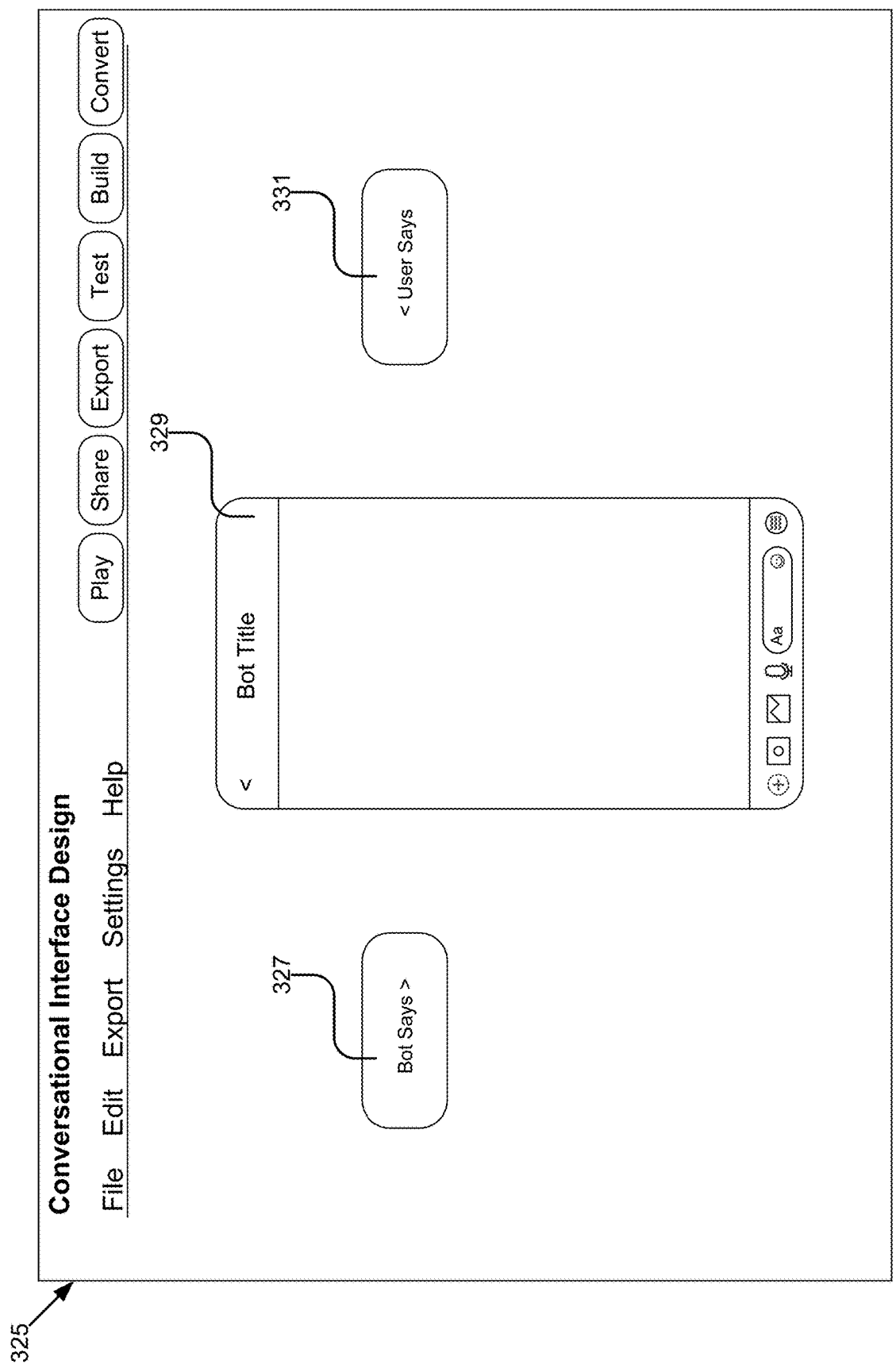

In some embodiments, the conversational interface designer 202 receives the user selection of a technology platform, accesses the design templates 230 in the data storage 243 and retrieves a template for the conversational interface associated with the selected platform. The template may include style sheet specifications of font, color, and layout settings for presenting the conversational interface matching the selected technology platform and/or type of conversational interface. The template may also include various formats of visual components used to define the messages for the conversational interaction in the conversational interface. The use of templates is advantageous as it ensures that the conversational interface for a selected type or platform will work as intended by the design. The conversational interface designer 202 transmits the template to the user interface engine 210 and signals the user interface engine 210 to display the user interface associated with curating a conversational interface on a client device 115 to the user. In FIG. 3B, the user interface 325 depicts a simple view of an interface associated with the conversational interface designer 202 for designing a conversational interface responsive to the user selection in FIG. 3A. The user interface 325 includes a first portion 327, a second portion 331, and a third portion 329. The user can begin to define or compose messages exchanged between conversational entities in an interaction on the conversational interface by selecting the first portion 327 and/or the second portion 331.

Figure 3C:
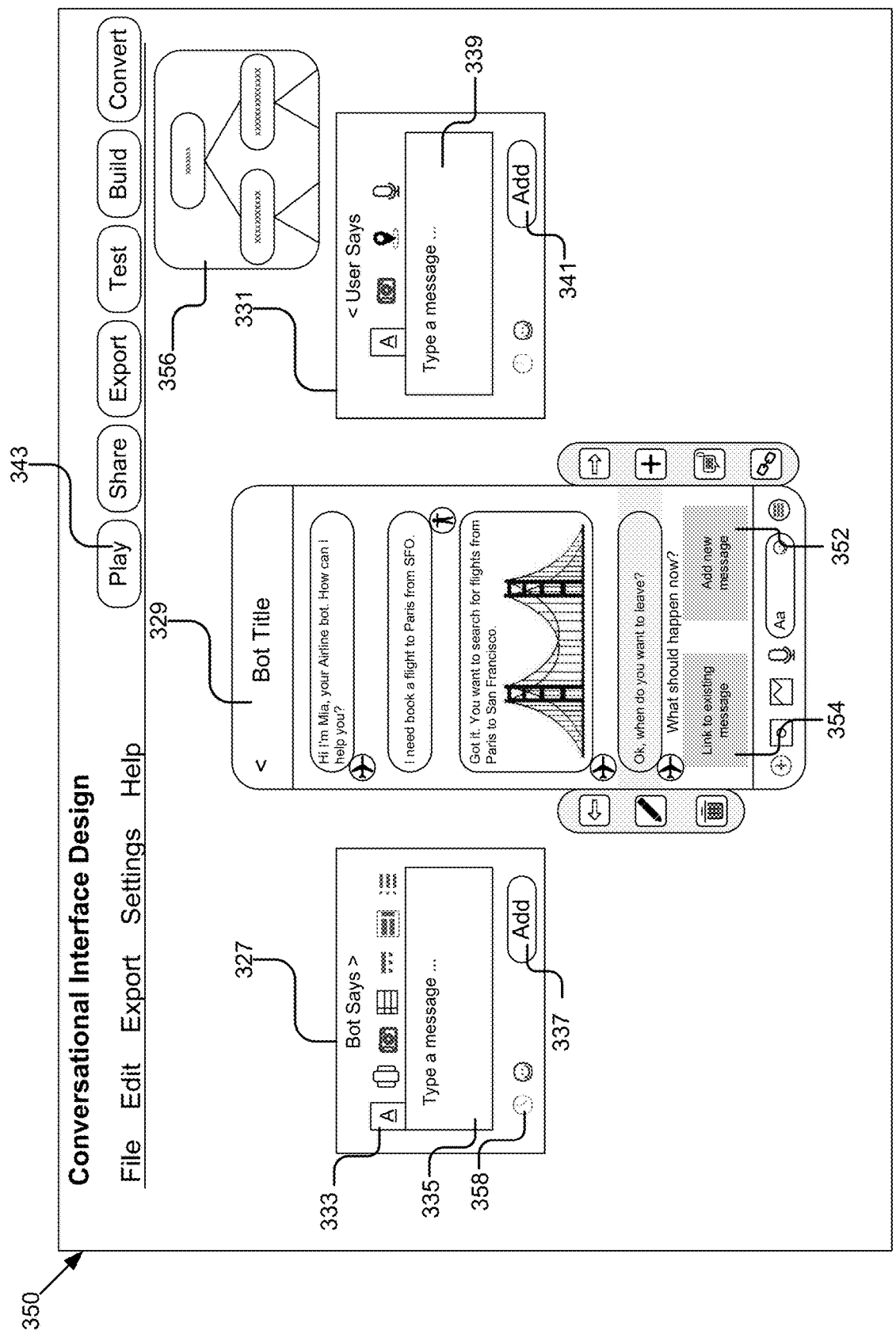

The conversational interface designer 202 may receive user input from the user for designing an interaction on the conversational interface via the first portion 327, the second portion 331, and/or the third portion 329. In FIG. 3C, the user interface 350 depicts a detailed view of the interface associated with the conversational interface designer 202 for designing conversational interfaces. The first portion 327 is an editing or input area associated with defining a first message object attributed to a first conversational entity, such as a chatbot or virtual assistant interacting with a user. The second portion 331 is another editing or input area associated with defining a second message object attributed to a second conversational entity, such as a user interacting with the chatbot or virtual assistant. The third portion 329 is a preview area associated with depicting a structure of a conversational interaction between the first and the second conversational entities. In the example of FIG. 3C, the third portion 329 includes a frame of a smartphone to depict that the conversational interface is accessed through a messaging application on the smartphone. In another example, the third portion 329 may be depicted without a device frame.

In some embodiments, the conversational interface designer 202 receives the user interaction defining a message object in one or more formats for a conversational entity and signals the object generator 204 to generate and store a corresponding message object in the data storage 243. As the conversational interaction is curated by the user in a back-and-forth manner in the first portion 327 and the second portion 331, the conversational interface designer 202 receives the message objects attributed to the first and the second conversational entities in their order of receipt and displays an arrangement of the message objects depicting a structure of the interaction in the third portion 329 in real time. For example, as seen in FIG. 3C, the user may select a format 333 in the first portion 327 for defining a first message object attributed to the chatbot. The format 333 is one of several formats to define a message object and is described in detail below with reference to FIGS. 5A-5F. In FIG. 3C, the format 333 is associated with creating a text prompt, such as acknowledgments, confirmations, greetings, questions, suggestions, etc. The user creates the first message object by composing the message in the field 335. The user may design for how long the message should be shown during the preview by selecting the time icon 358. In response to user selection of the "Add" button 337, the third portion 329 presents the first message object in the third portion 329. Similarly, the user may create a second message object attributed to the user in the second portion 331 by composing the message in the field 339 and selecting the "Add" button 341. In response to selection of the "Add" button 341, the third portion 329 presents the second message object below the first message object to depict the interaction or exchange between the chatbot and the user. In some embodiments, the conversational interface designer 202 may receive user annotation in association with a message object in the third portion 329 and signals the object generator 204 to store the user annotation for the message object.

Figure 3D:
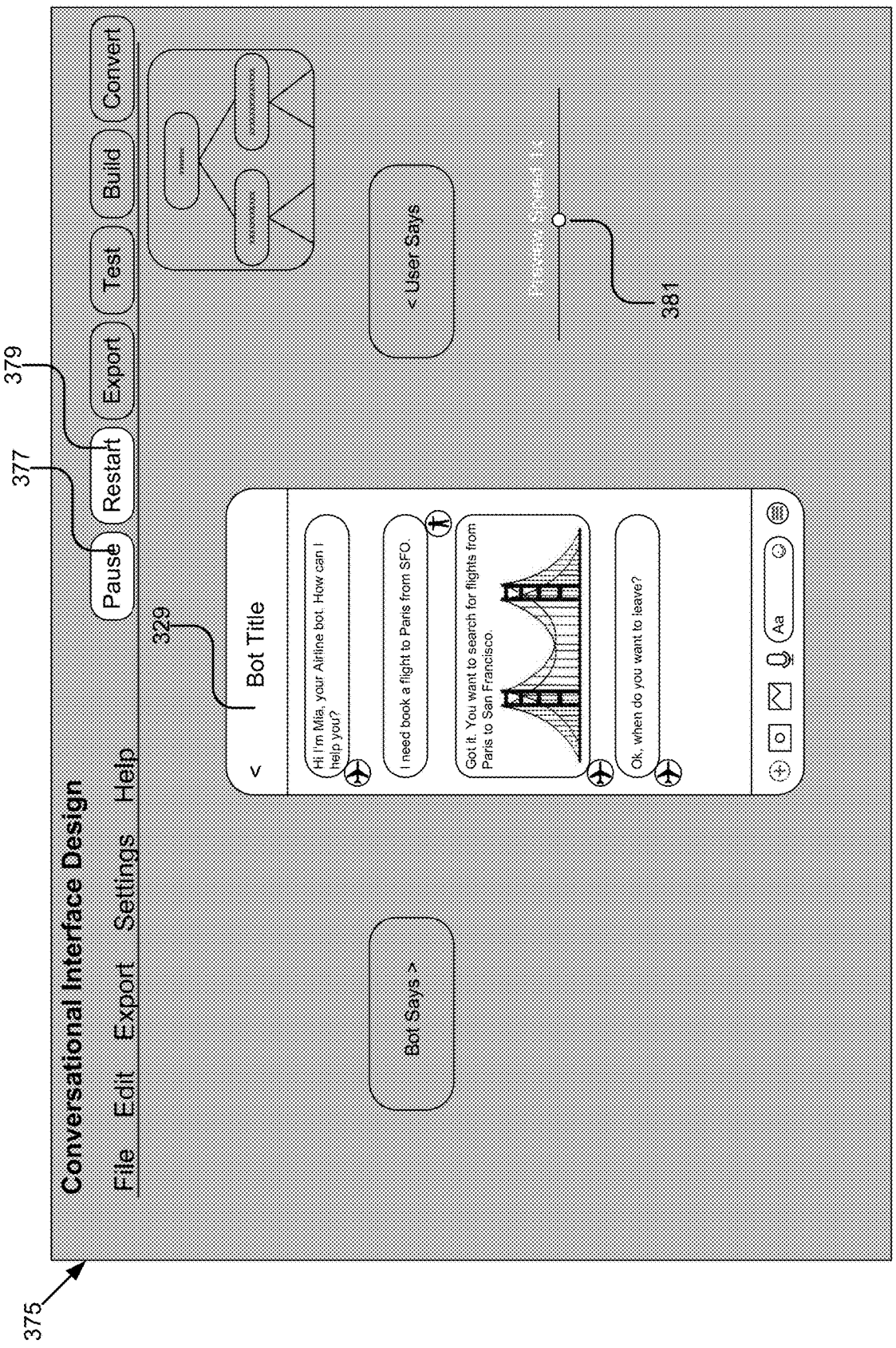

In some embodiments, the conversational interface designer 202 may receive a user request to preview the conversational interaction in the conversational interface at any point in time during the design of the conversational interface. For example, as seen in FIG. 3C, the user request is a user selection of a graphical element "Play" button 343 in the user interface 350. In response to the user request, the conversational interface editor 302 signals the object generator 204 to generate a preview of the interaction using the message objects attributed to the conversational entities. The preview may be audio and/or video depending on the conversational interface design. The conversational interaction in the conversational interface may change over time. The preview of the conversational interface is advantageous as it provides an instant feedback about the user experience and facilitates the user to effectively and iteratively design the conversational interface. The preview of the conversational interface may expose usability issues and allow the user to correct his or her design strategy. Furthermore, this is achieved without the user having to program the conversational interface which is time consuming. In FIG. 3D, the user interface 375 depicts a playback of the audio and/or video previewing the conversational interaction designed in FIG. 3C. The third portion 329 is the preview area where the playback of the conversational interaction is previewed. The user can select the "Pause" button 377 to pause the playback and "Restart" button 379 to restart the playback from the beginning. Also, the user can adjust the speed at which the playback is previewed by adjusting the slider 381 accordingly. The user may also preview a single message object in the conversational interaction.

In some embodiments, the conversational interface designer 202 determines the structure of the conversational interaction in the conversational interface design and signals the visualizer 206 to generate and store a visualization of the flow of the conversational interaction for the conversational interface design in the data storage 243. In the example of FIG. 3C, the user interface 350 depicts a graphical element 356 for viewing a flowchart of the conversational interaction. In some embodiments, the conversational interface designer 202 may receive user interaction manipulating the message objects in the preview portion of the user interface for designing the conversational interface. In the example of FIG. 3C, the user may manipulate the conversational interaction by selecting, dragging, and dropping the messages in the preview portion 329 and thereby altering the order of message objects. The preview portion 329 may also include dedicated graphical elements or buttons in association with the message object for editing, deleting, commenting, linking, cloning, and creating alternate or new paths from the message objects. In response to receiving the user interaction in the preview portion, the conversational interface designer 202 signals the visualizer 206 to update and restructure the visualization of the flow of the conversational interaction to match the manipulation of message objects effected by the user interaction.

Figure 4A:
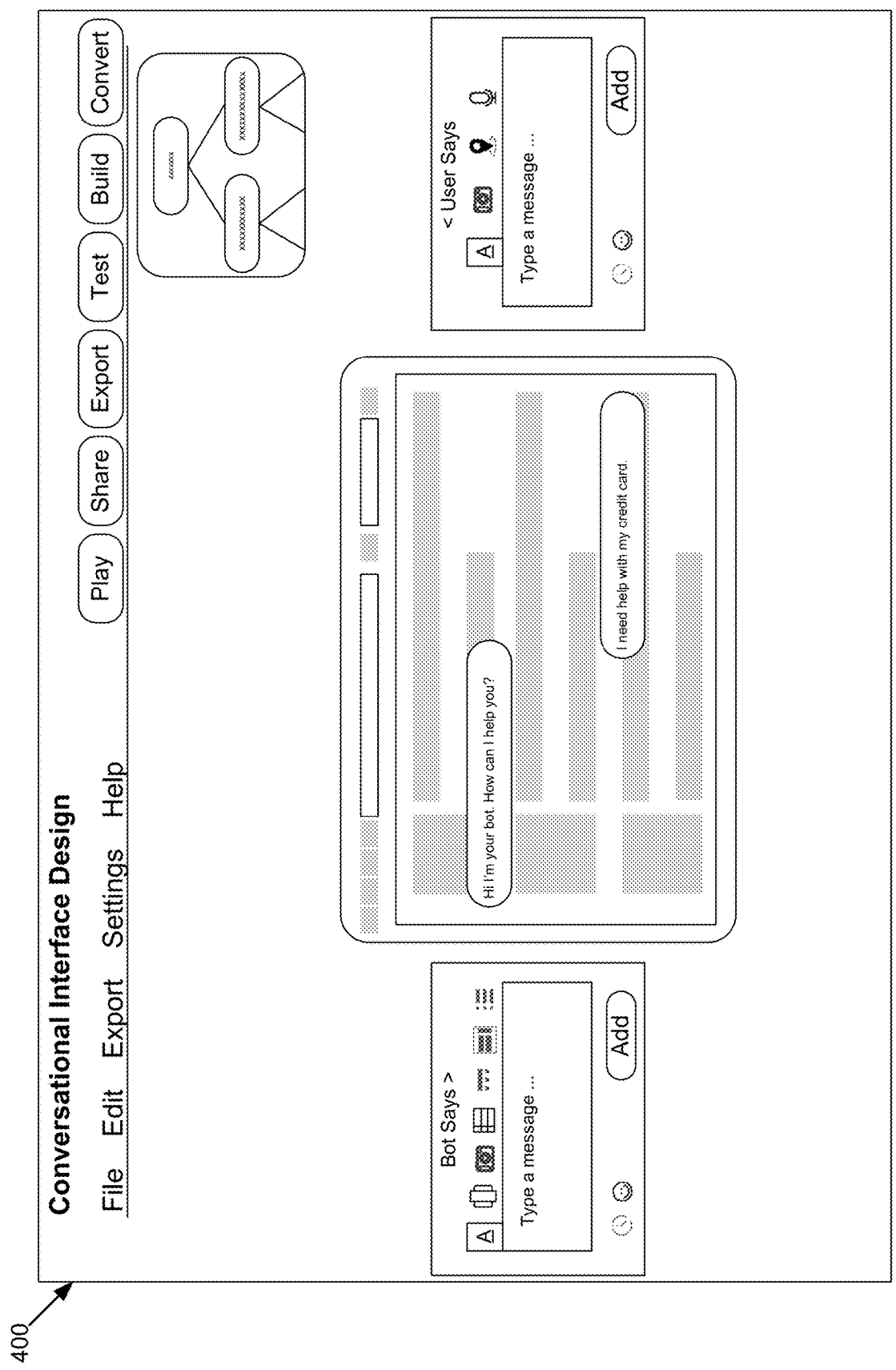
FIGS. 4A-4B show example graphical representations illustrating embodiments of user interfaces for designing a conversational user interface.
Figure 4B:
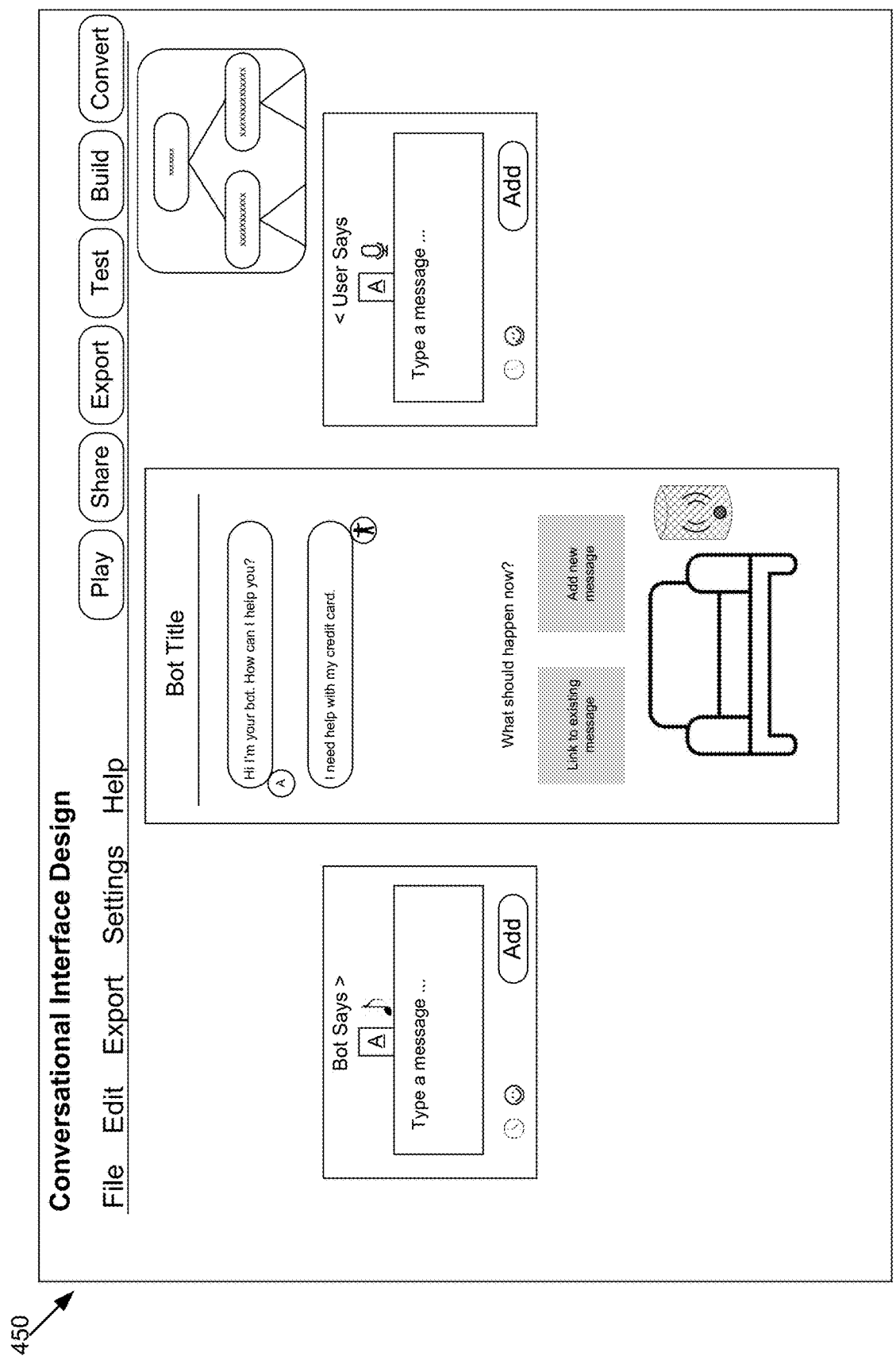

Referring to FIGS. 4A-4B, the example graphical representations illustrate embodiments of user interfaces for designing another conversational interface. In FIG. 4A, the graphical representation illustrate a user interface 400 for designing a conversational interface on a website accessed through a web browser. In FIG. 4B, the graphical representation illustrate a user interface 450 for designing a conversational interface for a voice-based smart speaker device in a living room. The conversational experience in the spoken words is different compared to the written interaction via the chat interface. Using preview functionality on the user interface 450, the user can preview the audio interaction in the conversational interface.

Figure 5C:
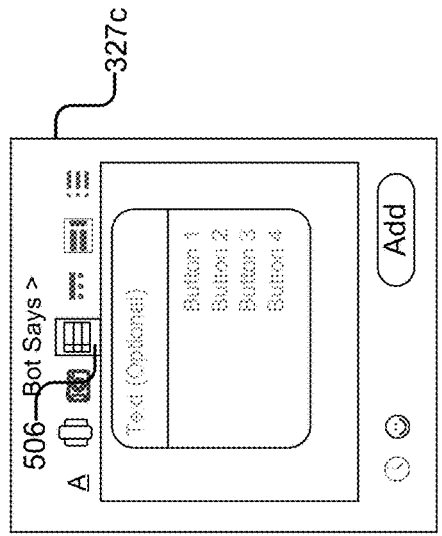
FIGS. 5A-5F show example graphical representations illustrating embodiments of user interfaces for designing a message object in a design of the conversational interface.
Figure 5F:
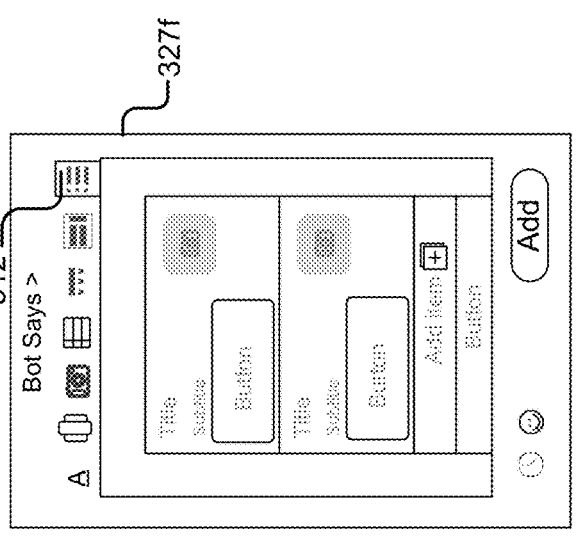
Figure 5B:
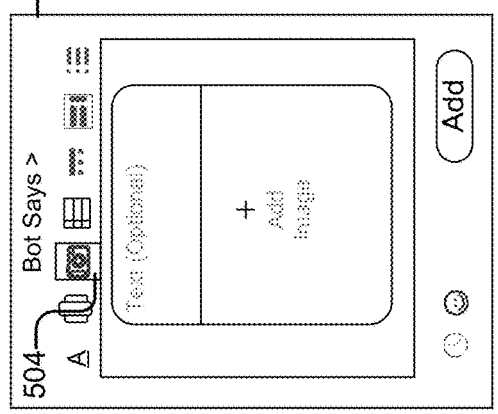
Figure 5E:
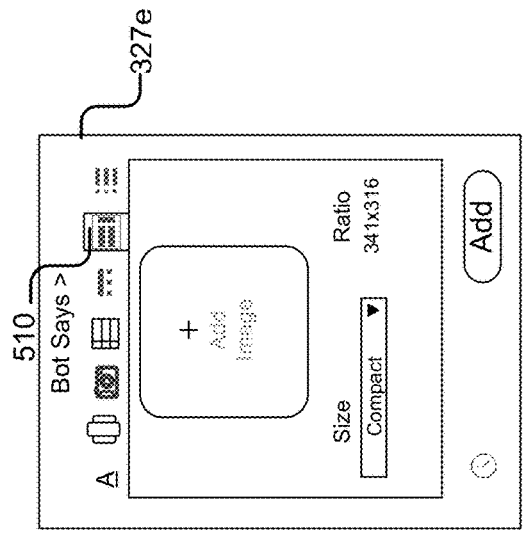
Figure 5A:
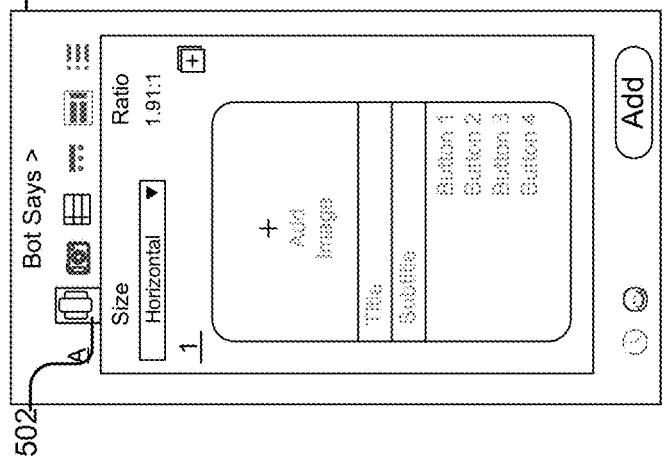
Figure 5D:
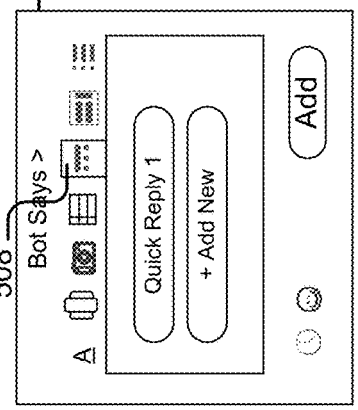

Referring to FIGS. 5A-5F, the example graphical representations illustrate embodiments of the first portion 327 in FIG. 3C for defining a format of a message object using a visual component. A visual component may include cards, carousels, lists, and other visual assets used to present detailed information by a conversational entity in an interaction on the conversational interface. In FIG. 5A, a first embodiment of the first portion 327a depicts an editing area for adding a carousel 502 as a message object. The carousel 502 allows the user to design several selectable items in an interactive carousel in the conversational interface. Each item may be differentiated by an image and title. In FIG. 5B, a second embodiment of the first portion 327b depicts an editing area for adding a basic card 504 as a message object. The card 504 allows the user to design an item with a text and image in the conversational interface. In FIG. 5C, a third embodiment of the first portion 327c depicts an editing area for adding one or more buttons 506 as a message object. The button 506 allows the user to design one or more selectable items differentiated by text in the conversational interface. In FIG. 5D, a fourth embodiment of the first portion 327d depicts an editing area for adding quick replies or suggestions 508 that continue or pivot the conversation in the conversational interface. In FIG. 5E, a fifth embodiment of the first portion 327e depicts an editing area for adding a webview 510 as a message object. The webview 510 allows user to design web content for presentation in the conversational interface. In FIG. 5F, a sixth embodiment of the first portion 327f depicts an editing area for adding a list 512 as a message object. The list 512 allows user to design several selectable items in a list differentiated by text and/or image in the conversational interface.

In some embodiments, the conversational interface designer 202 may receive a user request to convert a design of a conversational interface from one type to another. For example, the user may request to convert a design of a first conversational interface curated for a messaging application platform to a new design of a second conversational interface for a social networking application platform. In another example, the user may request to convert a design of a first conversational interface curated for a smartphone to a new design of a second conversational interface for a smart speaker. The conversational interface designer 202 enables the user to smoothly convert the conversational interface design from one type to another type without losing the structure of conversational interaction. In some embodiments, the user may access a user interface (e.g., conversational interface design converter) associated with the conversational interface designer 202 for converting the conversational interaction from one conversational interface design to another.

Figure 7A:
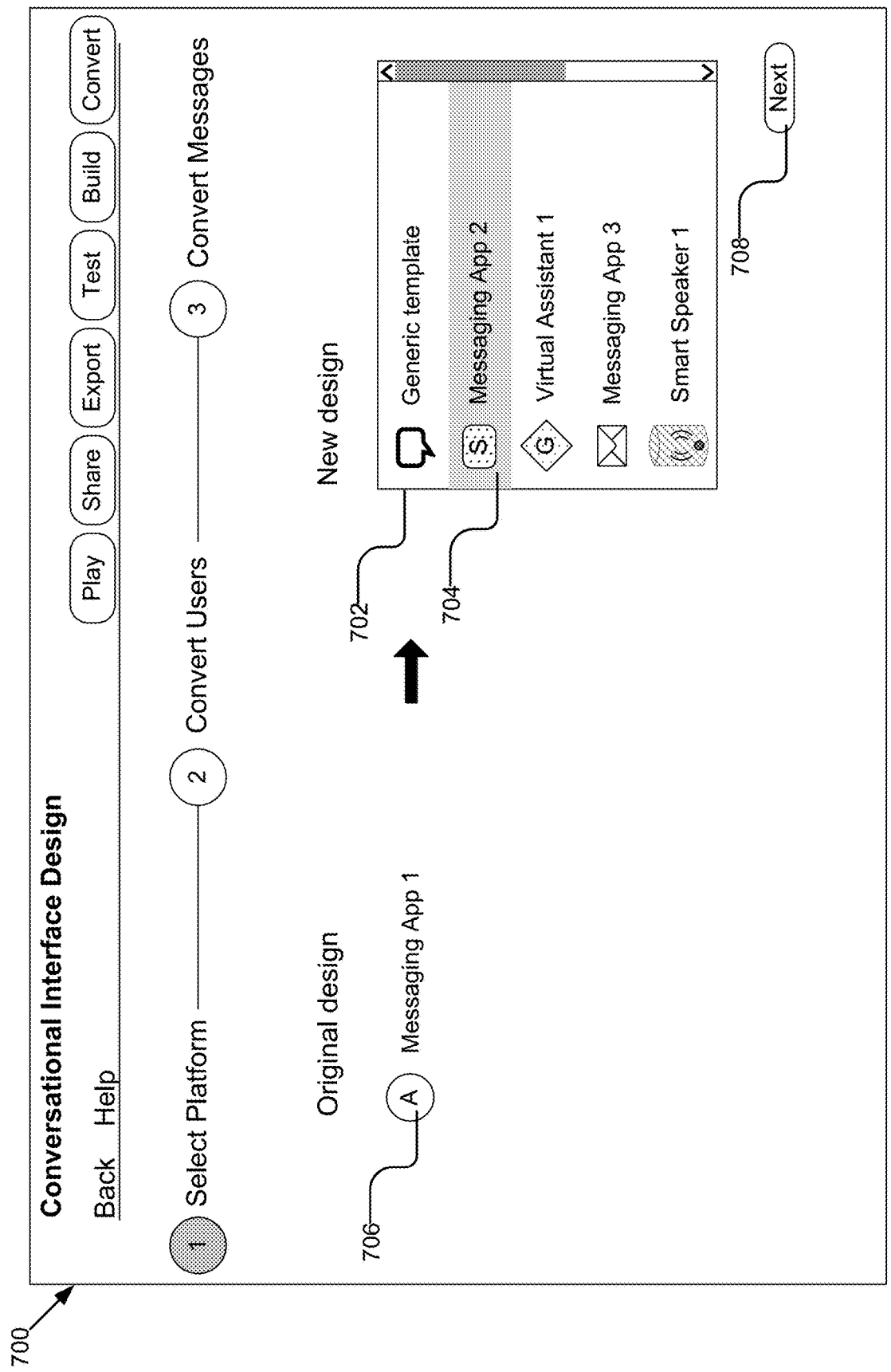
FIGS. 7A-7C show example graphical representations illustrating user interfaces for converting the conversational interaction from a first conversational interface design to a second conversational interface design.
Figure 7B:
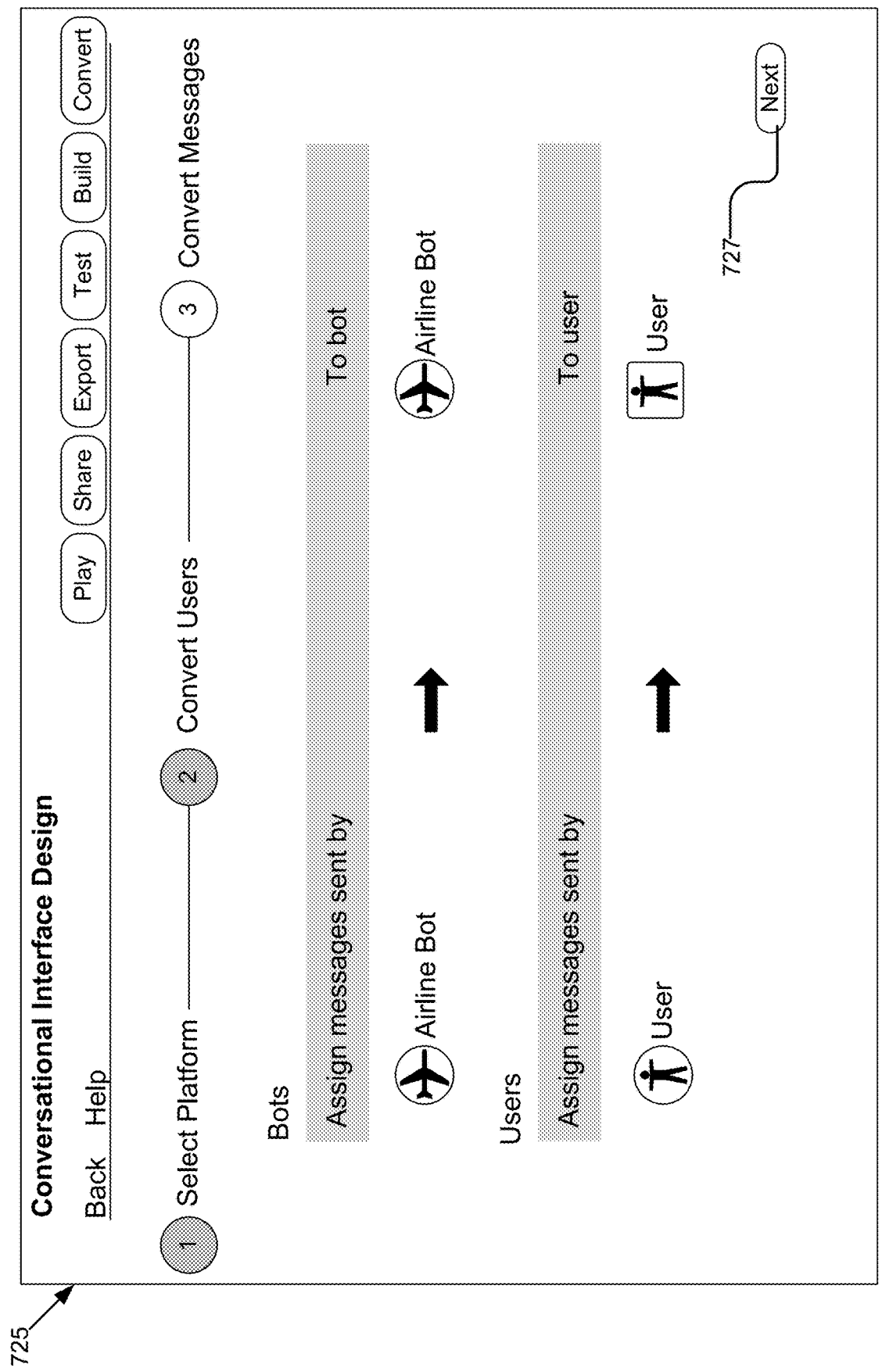
Figure 7C:
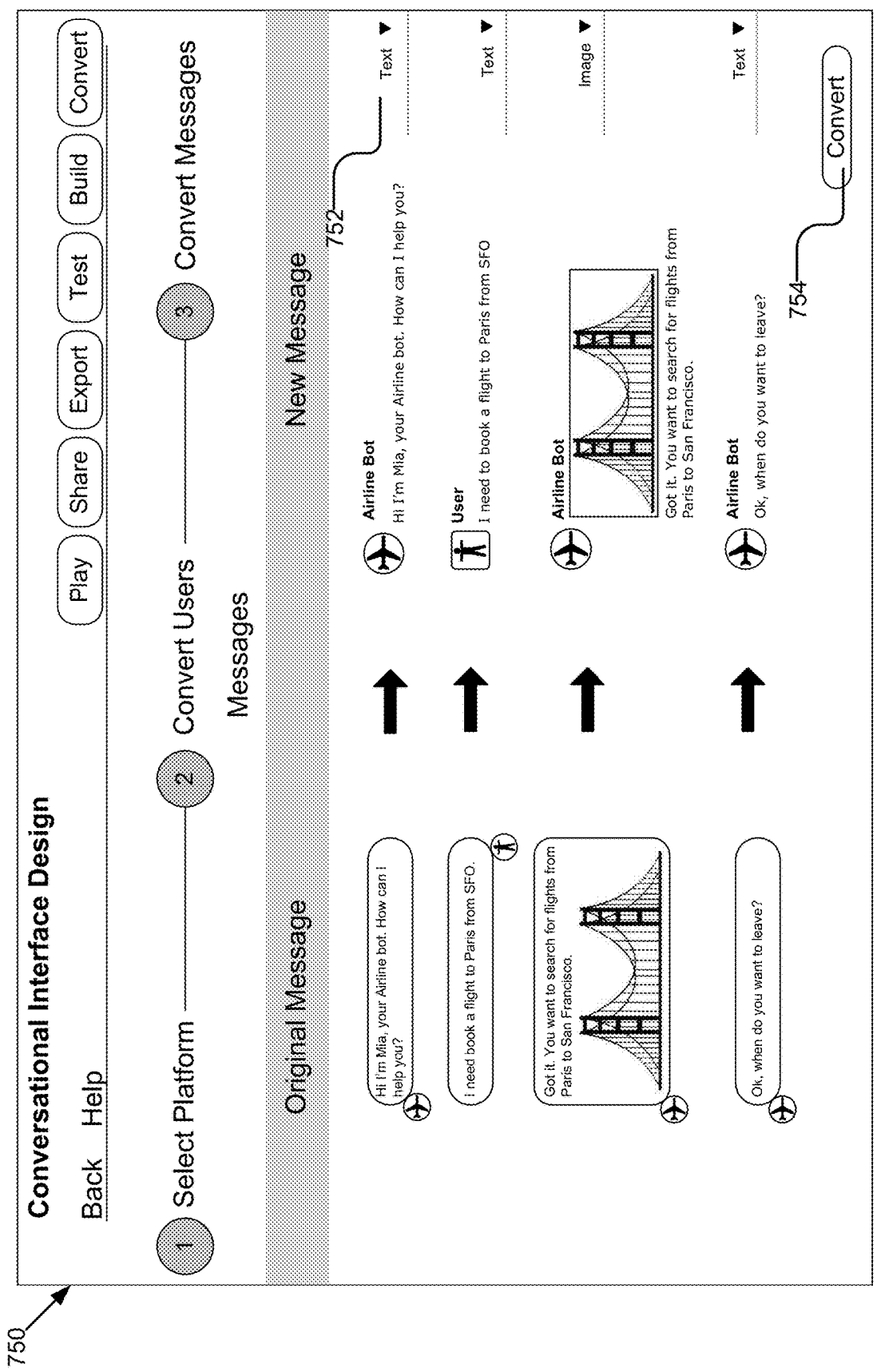

FIGS. 7A-7C show example graphical representations illustrating user interfaces for converting the conversational interaction from a first conversational interface design to a second conversational interface design. In FIG. 7A, the user interface 700 depicts a home page for converting a conversational interface from an original design to a new design. As a first step, the user selects the drop down menu 702 under new design to select a technology platform 704 for converting the original design of a conversational interface under the technology platform 706. The conversational interface designer 202 accesses the design templates 230 for conversational interfaces in the data storage 243 and retrieves a template matching the technology platform of the new design. After selecting the technology platform 704 for the new design, the user selects the next button 708 to perform the next step of the conversion process. In FIG. 7B, the user interface 725 depicts a selection menu for correlating the conversational entities from the original design to the new design of the conversational interface. After the conversational entities are correlated, the user selects the next button 727 to perform the third step of the conversion process. The conversational interface designer 202 uses the retrieved design templates for the new design and signals the user interface engine 210 to display the user interface comparing the conversational interaction from an original conversational interface design to a new conversational interface design. As shown in FIG. 7C, the user interface 750 depicts the messages of the original design and the new design placed side by side. The conversational interface designer 202 updates the font style, color, and layout of the messages in the new conversational interface design to match the target technology platform using the retrieved design templates. The user may change a format 752 of a message in the new design. While converting a conversational interface from one technology platform to another, the message formatting may differ. For example, the original conversational interface design in one technology platform may support presenting a carousel with multiple images in a single message and the new conversational interface design may support presenting one image in a single message. The carousel with multiple images in the original conversational interface design may be converted into a single message containing the first image of carousel or to multiple messages, each message containing one image. After the formatting changes to the messages are completed, the user selects the convert button 754 to complete converting the conversational interface from the original design to a new design.

A design of a conversational interaction in a conversational interface is dependent on the type of device. For example, a conversation through smart speakers or headphones may be carried by way of spoken prompts to convey the messages. In another example, a conversation on a screen-equipped device, such as a smart display at home may rely on spoken prompts to carry most of the conversation but the screen may also be used for conveying supplementary visual information to continue the conversation. In another example, a conversation on a TV, smartphone, laptop or wearable computing devices may be carried in either spoken and/or visual prompts. In some embodiments, the user may access a user interface associated with the conversational interface designer 202 for selecting a type of device to design a conversational interface.

Figure 8A:
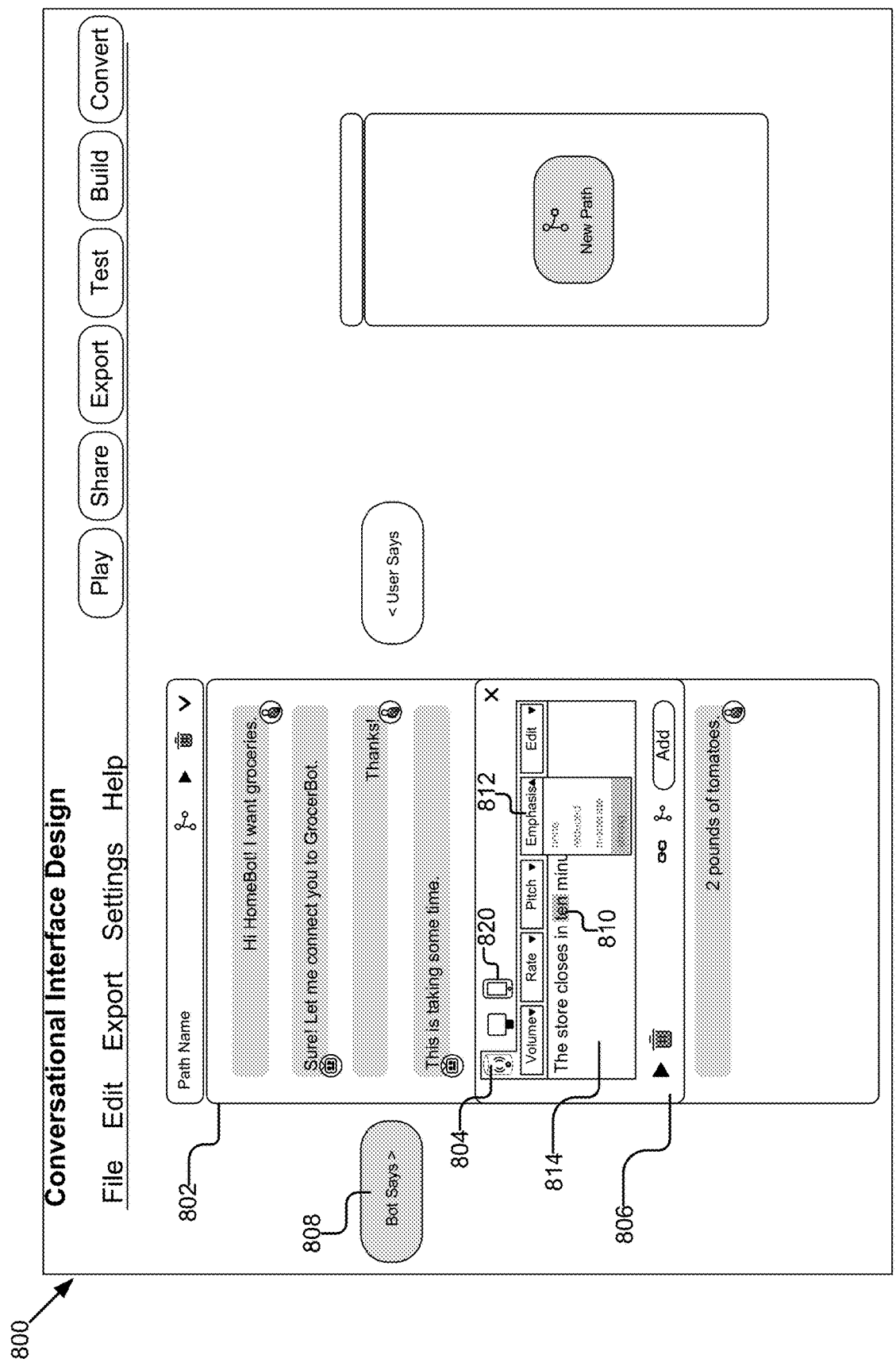
FIGS. 8A-8B show example graphical representations illustrating user interfaces for designing a conversational interface associated with a device.
Figure 8B:
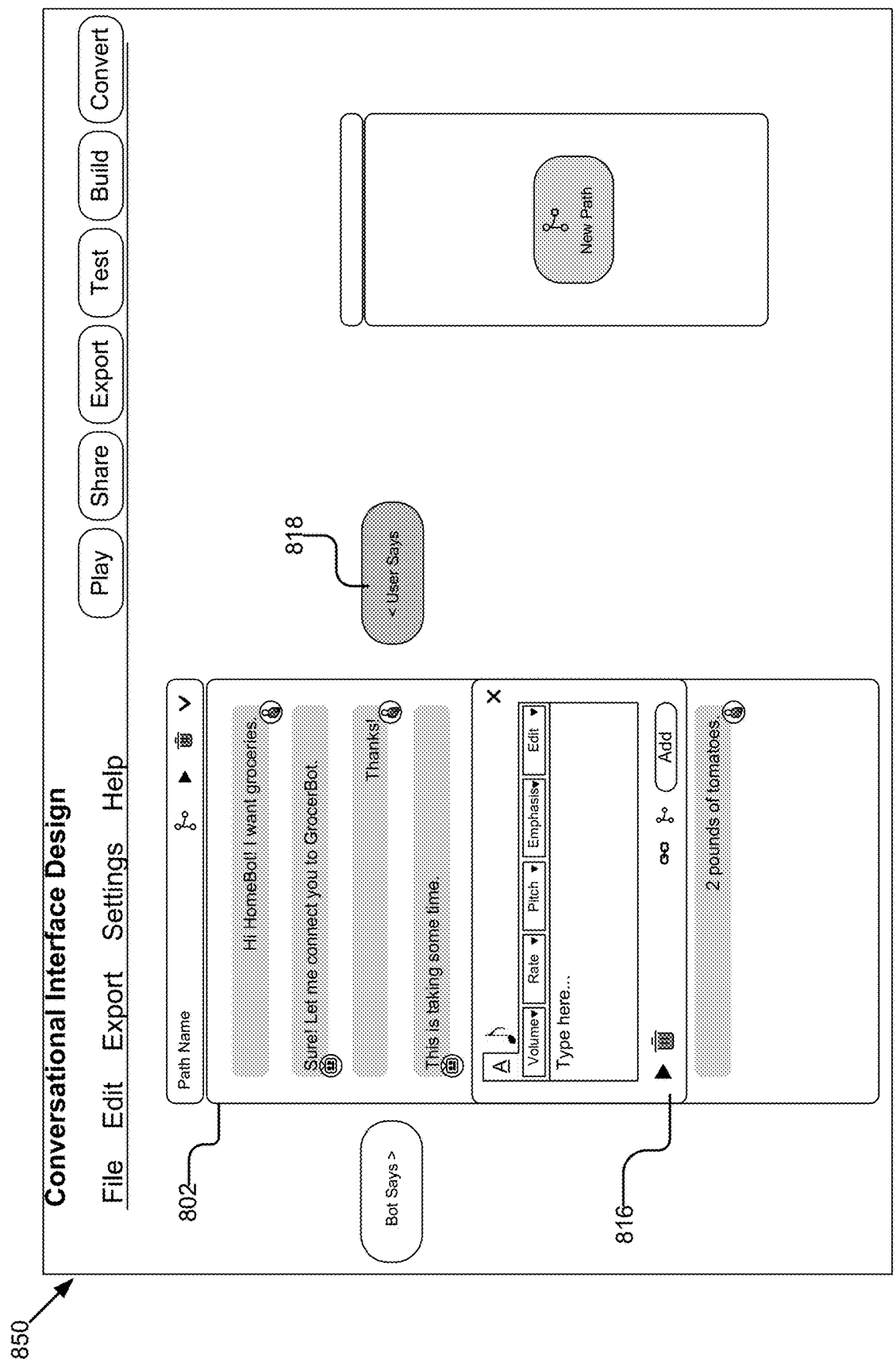

FIGS. 8A-8B show example graphical representations illustrating user interfaces for designing a conversational interface associated with a device. In FIG. 8A, the user interface 800 depicts a view of the interface associated with the conversational interface designer 202 for designing a conversational interface. The user interface 800 includes a preview portion 802 and a first editing portion 806. The first editing portion 806 is an input area associated with defining message objects attributed to a first conversational entity, such as a virtual assistant or chatbot. The preview portion 802 depicts a structure of the conversational interaction that is being designed. The first editing portion 806 is shown embedded or inlaid within the preview portion 802 in response to the user selecting the button 808. The message objects in the preview portion 802 may scroll up or down away from the first editing portion 806 so that the message objects are not hidden from user view while designing the conversational interface. In the first editing portion 806, the user may select device icon 804 to design the conversational interface for a smart speaker. The user may define a synthesized text-to-speech message object in the field 814. As the interaction is voice-based, the user may format the text of the message in the field 814 to change intonation of the voice attributed to the virtual assistant. In the example of FIG. 8A, the user selects the word "ten" to add emphasis when it is spoken by the virtual assistant in a preview of the conversational interface. The user selects the Emphasis tab 812 and selects "Strong" in the drop down menu. The emphasized word 810 is shown in bold to indicate to the user that it is emphasized. In another example, the user may add silence or pauses and adjust how numbers are read out in the voice of the virtual assistant in the preview. The conversational interface designer 202 signals the object generator 204 to export the message in the field 814 into Speech Synthesis Markup Language (SSML) format.

In FIG. 8B, the user interface 850 depicts another view of the interface associated with the conversational interface designer 202 for designing a conversational interface. The user interface 850 includes the preview portion 802 and a second editing portion 816. The second editing portion 816 is an input area associated with defining message objects attributed to a second conversational entity, such as a user. The second editing portion 816 is shown embedded or inlaid within the preview portion 802 in response to the user selecting the button 818.

A conversational interaction in a conversational interface may split into different paths based on user choices. Each of these paths may represent a key use case where a conversational path is taken by a user to complete an interaction or objective in the conversational interface. For example, a design for an airline chat bot that handles airline tickets for users may have three paths: a first path to book and purchase a new ticket, a second path to edit an existing booking, and a third path to review past purchases. In some embodiments, the user may access a user interface associated with the conversational interface designer 202 for designing one or more paths in an interaction on a conversational interface.

Figure 10A:
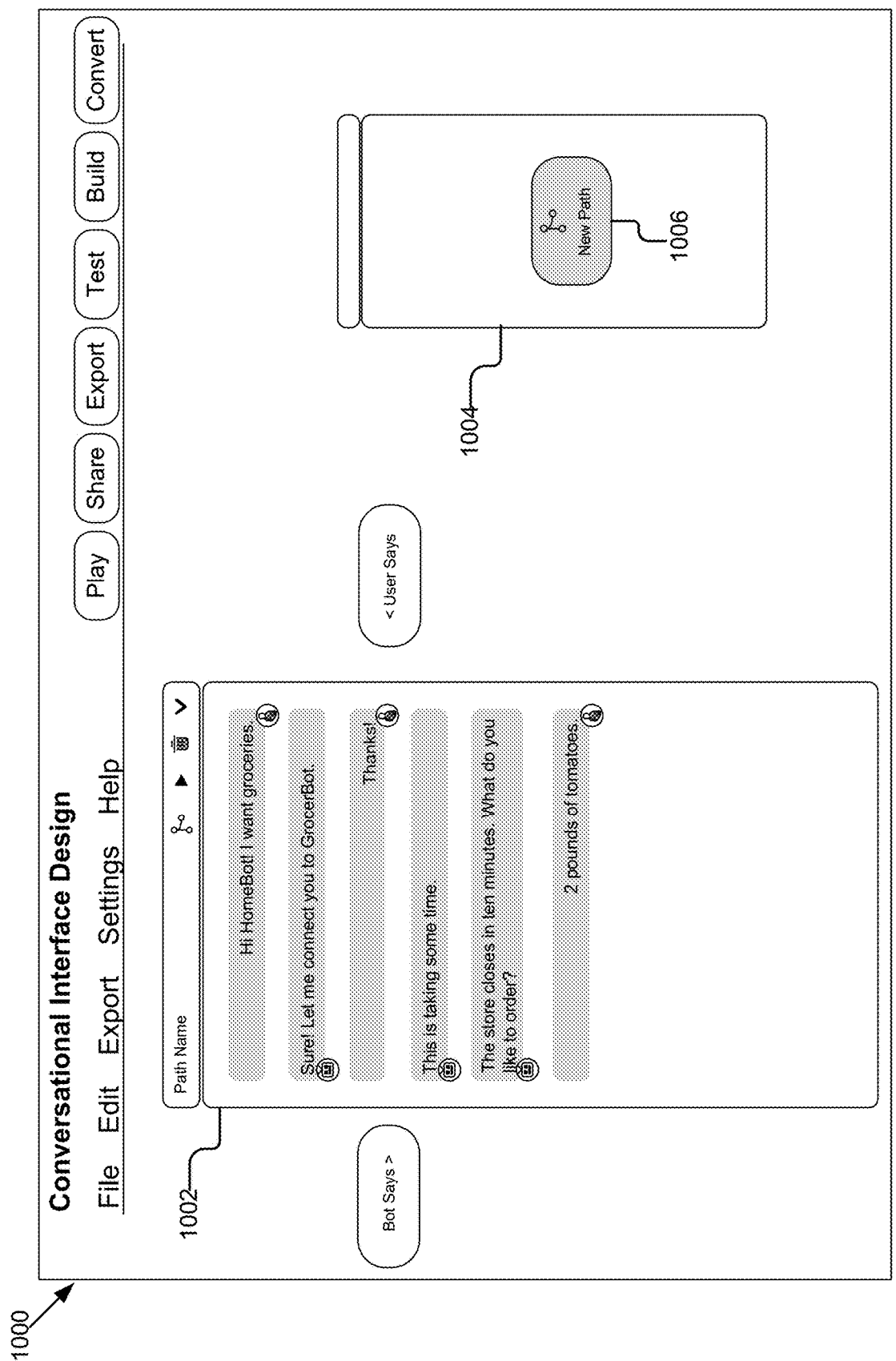
FIGS. 10A-10H show example graphical representations illustrating user interfaces for designing paths in a conversation interface.
Figure 10B:
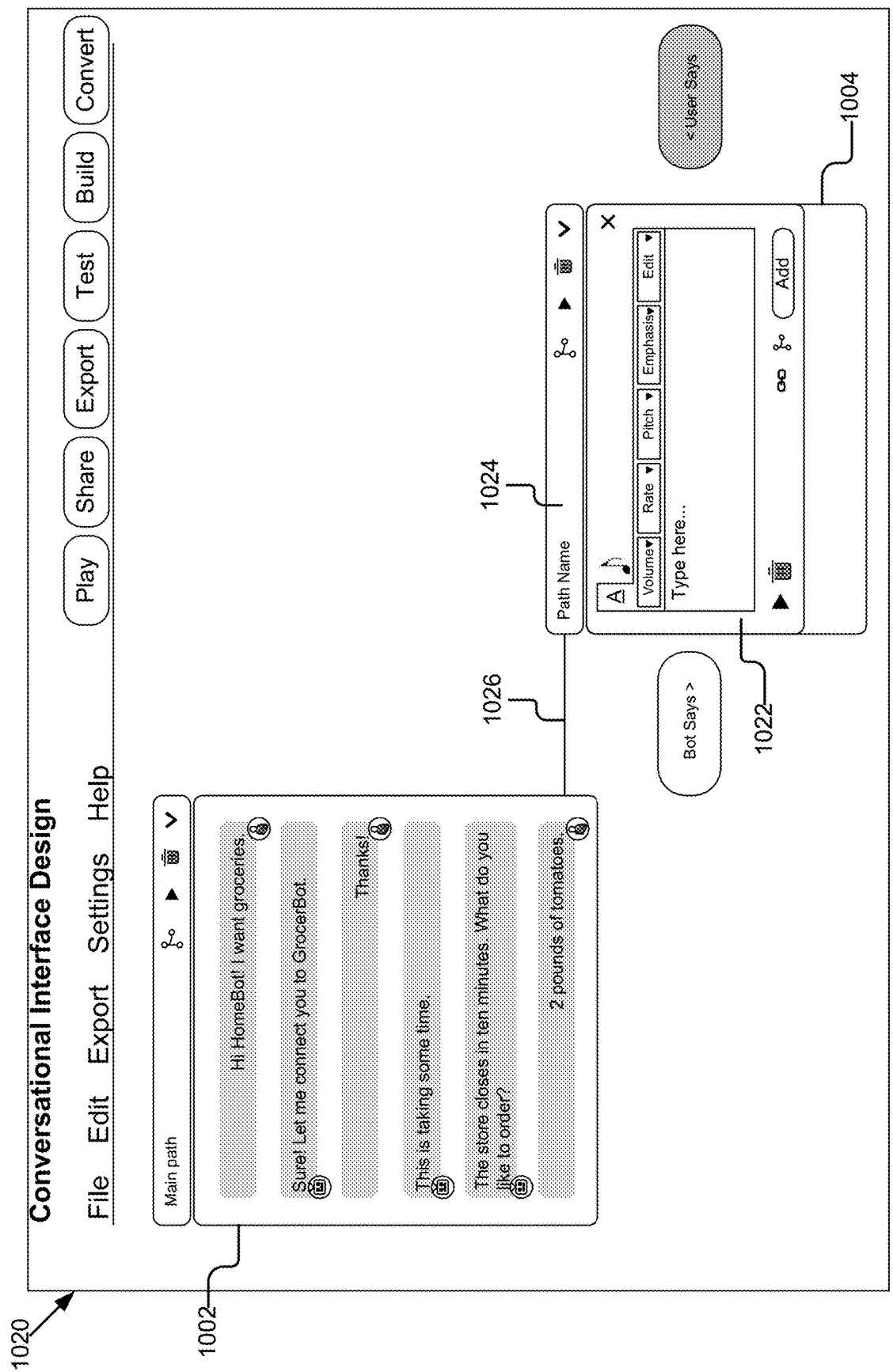
Figure 10C:
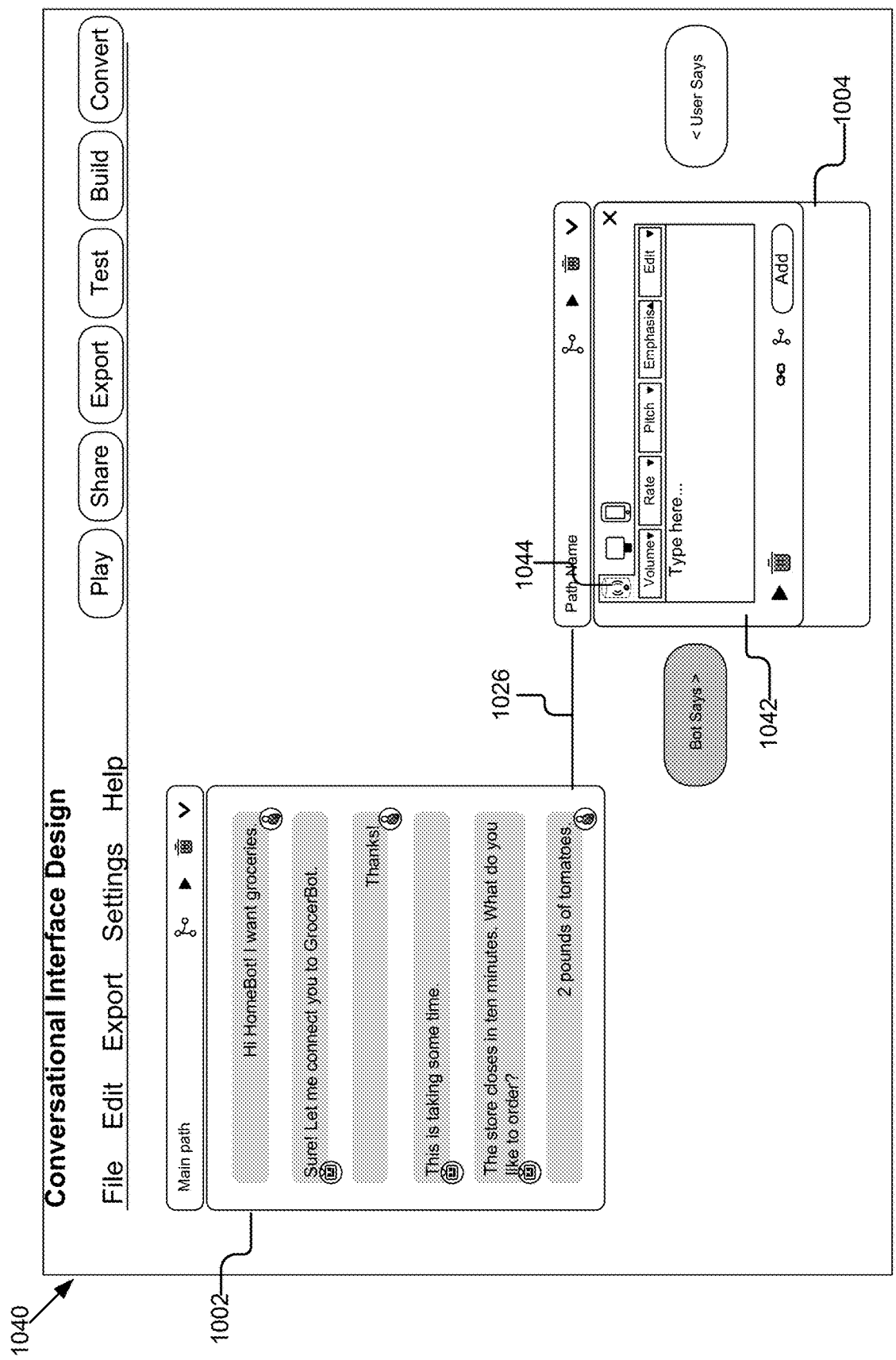

FIGS. 10A-10H show example graphical representations illustrating user interfaces for designing paths in a conversation interface. In FIG. 10A, the user interface 1000 depicts a view of the interface associated with the conversational interface designer 202 for designing a path. The user interface 1000 includes a preview portion 1002 and a path portion 1004. The preview portion 1002 depicts a default or main path of the conversational interaction in the design of the conversational interface. To create a new path from the main path, the user selects the button "New Path" 1006 in the path portion 1004. In FIG. 10B, the user interface 1020 shows an expanded view of the path portion 1004 in response to the user selecting the button "New Path" 1006. The path portion 1004 includes a first editing portion 1022 associated with defining message objects attributed to a first conversational entity, such as a user. The newly defined message objects are then shown in the path portion 1004. Once a new path is created in the path portion 1004, the conversational interface designer 202 automatically links the new path to a last message object in the main path depicted in the preview portion 1002. The user may enter a name for the new path in the field 1024. The name of the new path may be used for handover and mapping. In some embodiments, the conversational interface designer 202 receives a user selection of a message object in the preview portion 1002 and a user request to create a new path from the selected message object. In FIG. 10C, the user interface 1040 shows another expanded view of the path portion 1004 that includes a second editing portion 1042 associated with defining message objects attributed to a second conversational entity, such as a virtual assistant. In FIGS. 10A and 10B, the association between the main path in the preview portion 1002 and the new path in the path portion 1004 is depicted by the link 1026.

Figure 10D:
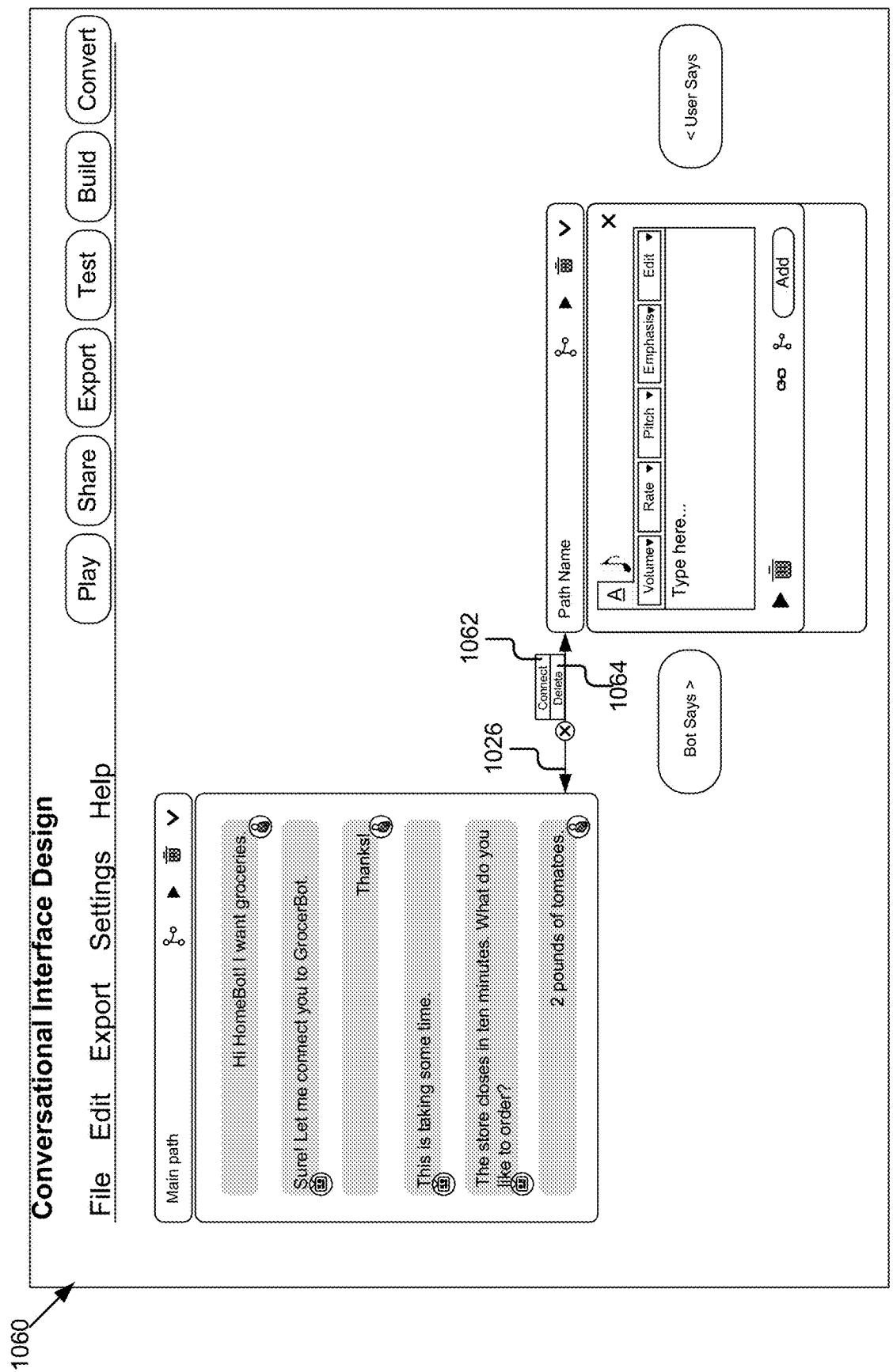
Figure 10E:
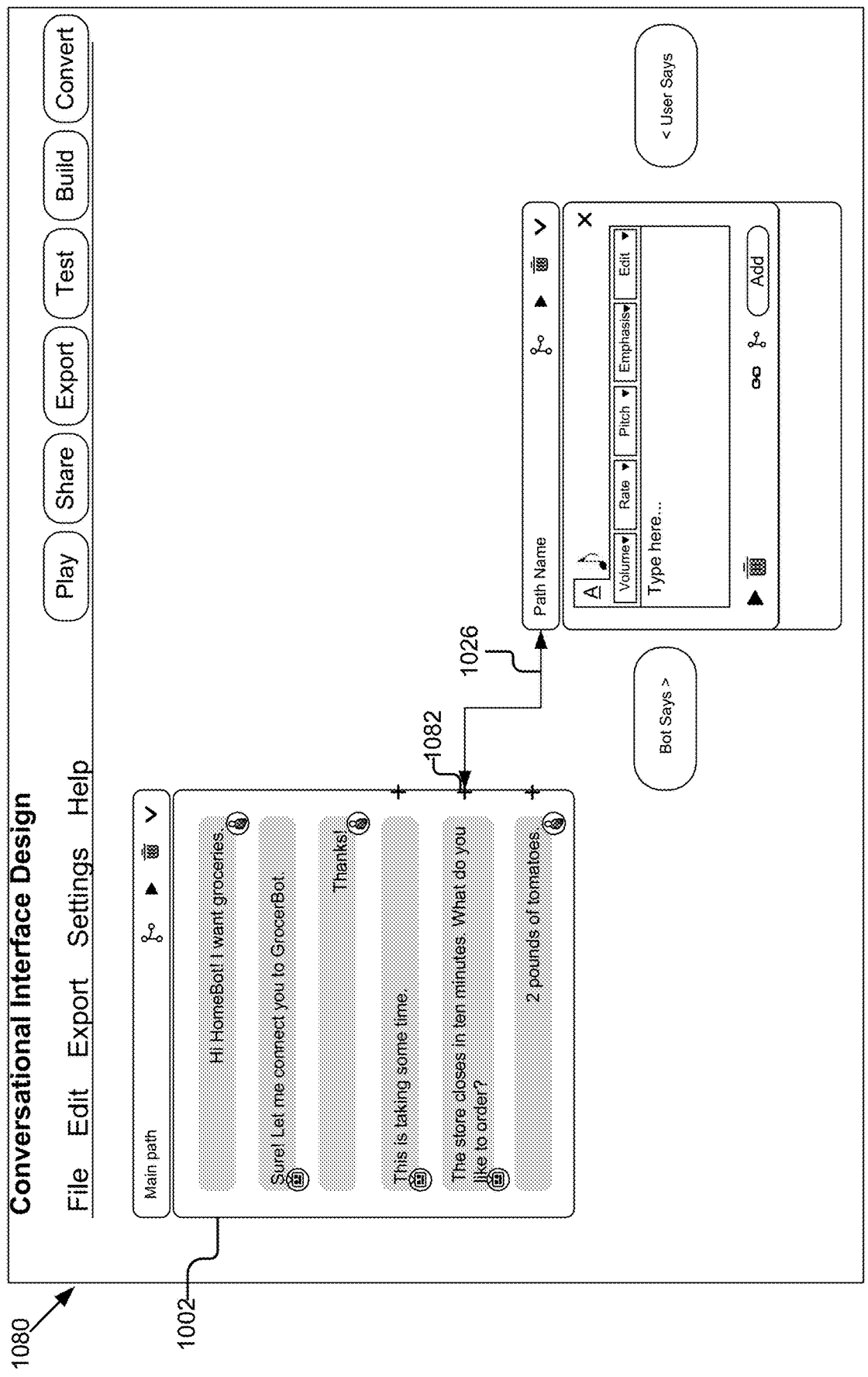

In FIG. 10D, the user interface 1060 depicts ways to modify the link 1026. The user may right-click on the link 1026 to bring up an options menu in association with the link 1026. The options menu depicts a "Connect" item 1062 and a "Delete" item 1064. FIG. 10E depicts the user interface 1080 that is generated in response to the user selecting the "Connect" item 1062 in FIG. 10D. In FIG. 10E, the user interface 1080 depicts a connection point 1082 on the message objects in the preview portion 1002. The user may select, drag, and drop the end point of the link 1026 to a connection point 1082 of a desired message object to rearrange the connection between the main path and the new path.

Figure 10F:
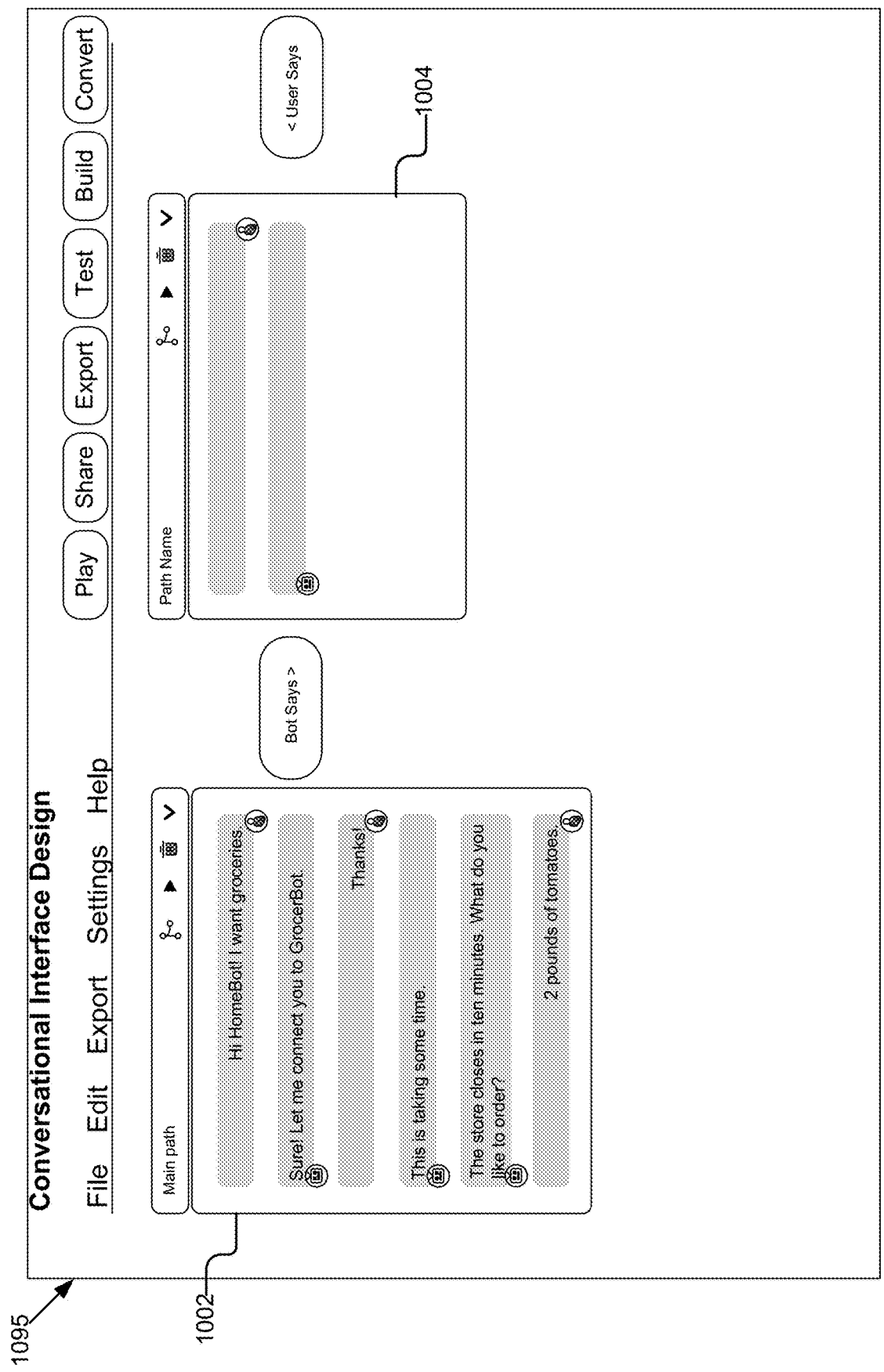

FIG. 10F depicts the user interface 1095 that is generated in response to the user selecting the "Delete" item 1064 to delete the link 1026 in FIG. 10D. In response to the deletion, the conversational interface designer 202 re-arranges the unlinked path in the path portion 1004 on a same hierarchical level as the main path 1002. This unlinked path is an example of a trigger path and/or a parallel path. A trigger path may be an interaction that gets triggered upon certain conditions in the conversational interface. For example, a design of an airline bot may have a trigger path associated with handling a returning customer. A parallel path is another use case that may be as important as the interaction in the main path. For example, a first path for editing an existing booking may be parallel to a second path for booking and purchasing ticket in the design of the airline bot conversational interface.

Figure 10G:
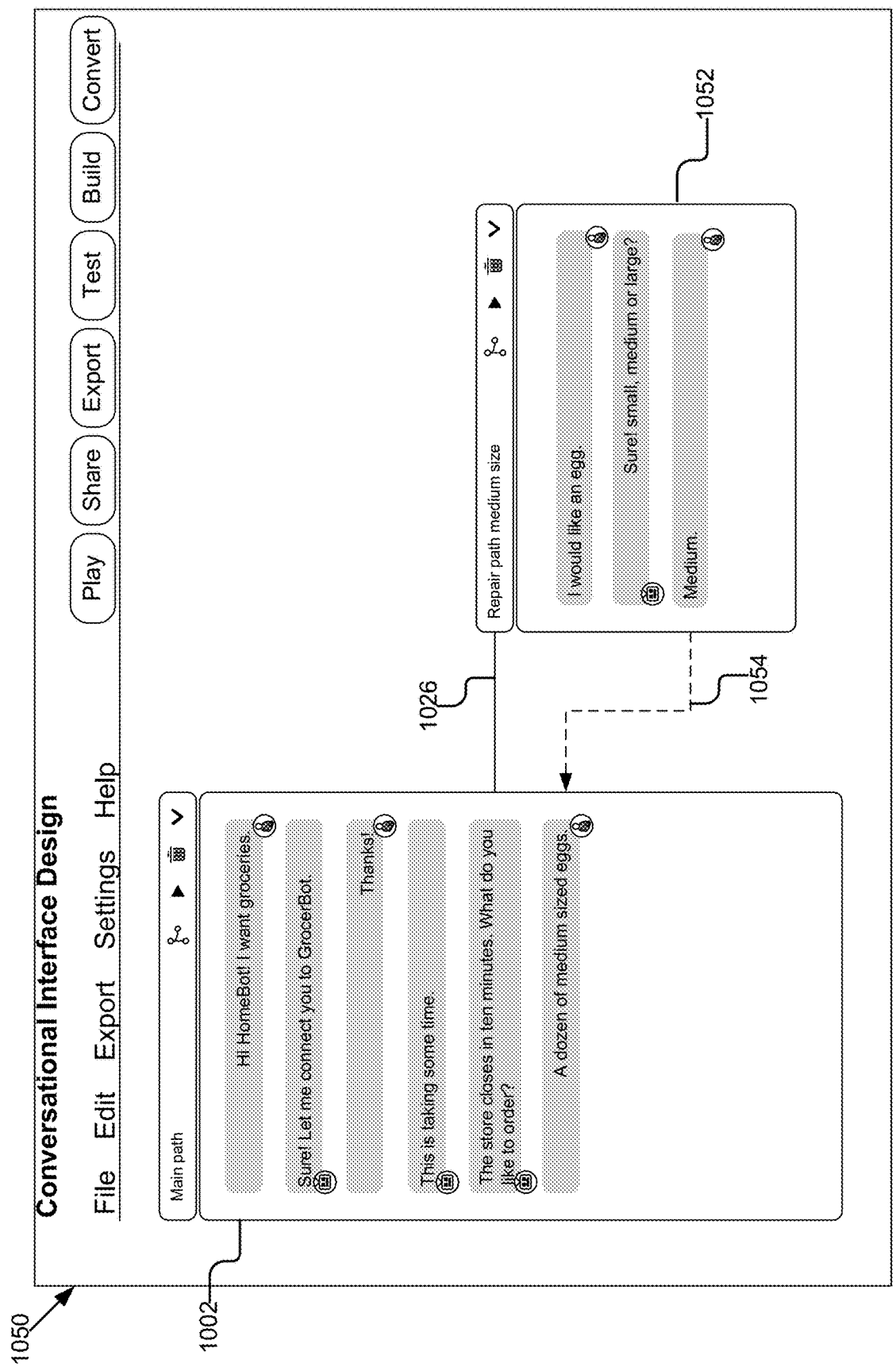
Figure 10H:
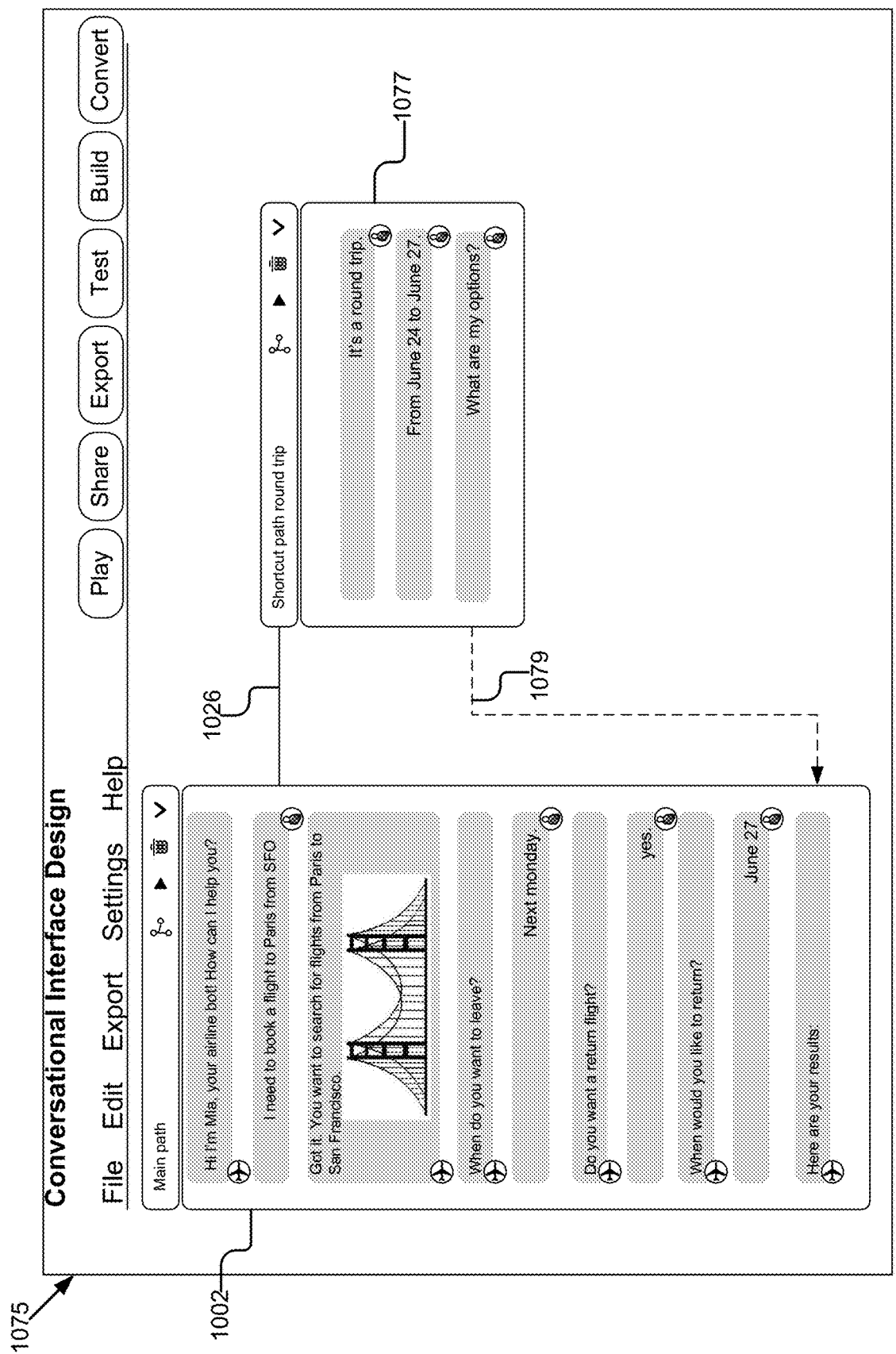

Each path designed in a conversational interface may have sub-paths. Examples of sub-paths include repair paths and shortcut paths. In a conversational interface, a side path may be triggered when a request in the user's dialogue is unexpected by the virtual assistant or chatbot assisting the user. The virtual assistant may ask the user additional questions to further understand what the user is requesting and to respond appropriately. The side path may be referred to as a repair path as it repairs the interaction in the main path. A shortcut path may be triggered when the user provides additional information without any prompting in the conversational interface. The virtual assistant or chatbot may then skip a part of the main interaction and reach a goal of the interaction quickly. In FIG. 10G, the user interface 1050 depicts a repair path 1052 that is repairing an interaction in the main path 1002. The user links the repair path 1052 back to a message object in the main path 1102 via the return link 1054. In FIG. 10H, the user interface 1075 depicts a shortcut path 1077 that skips over a part of the interaction in the main path 1002. The user links the shortcut path 1077 back to a message object in the main path 1102 via the return link 1079. After the paths are designed, the user may preview the interaction in each designed path in the user interface associated with the conversational interface designer 202.

In some embodiments, the user may access a user interface associated with the conversational interface designer 202 to design a same interaction on different devices. For example, if a user is requesting for weather information, a weather chatbot on a smartphone may display a card with weather information and an associated image. A smart speaker may play an audio file informing the user about the weather in response to a same request. The flow of conversation or the interaction is the same on both devices. Using the FIGS. 8A and 9 as examples to illustrate the process of designing the same interaction on different devices, the user may select the smart speaker icon 804 in the user interface 800 and design a synthesized text-to-speech message object.

Figure 9:
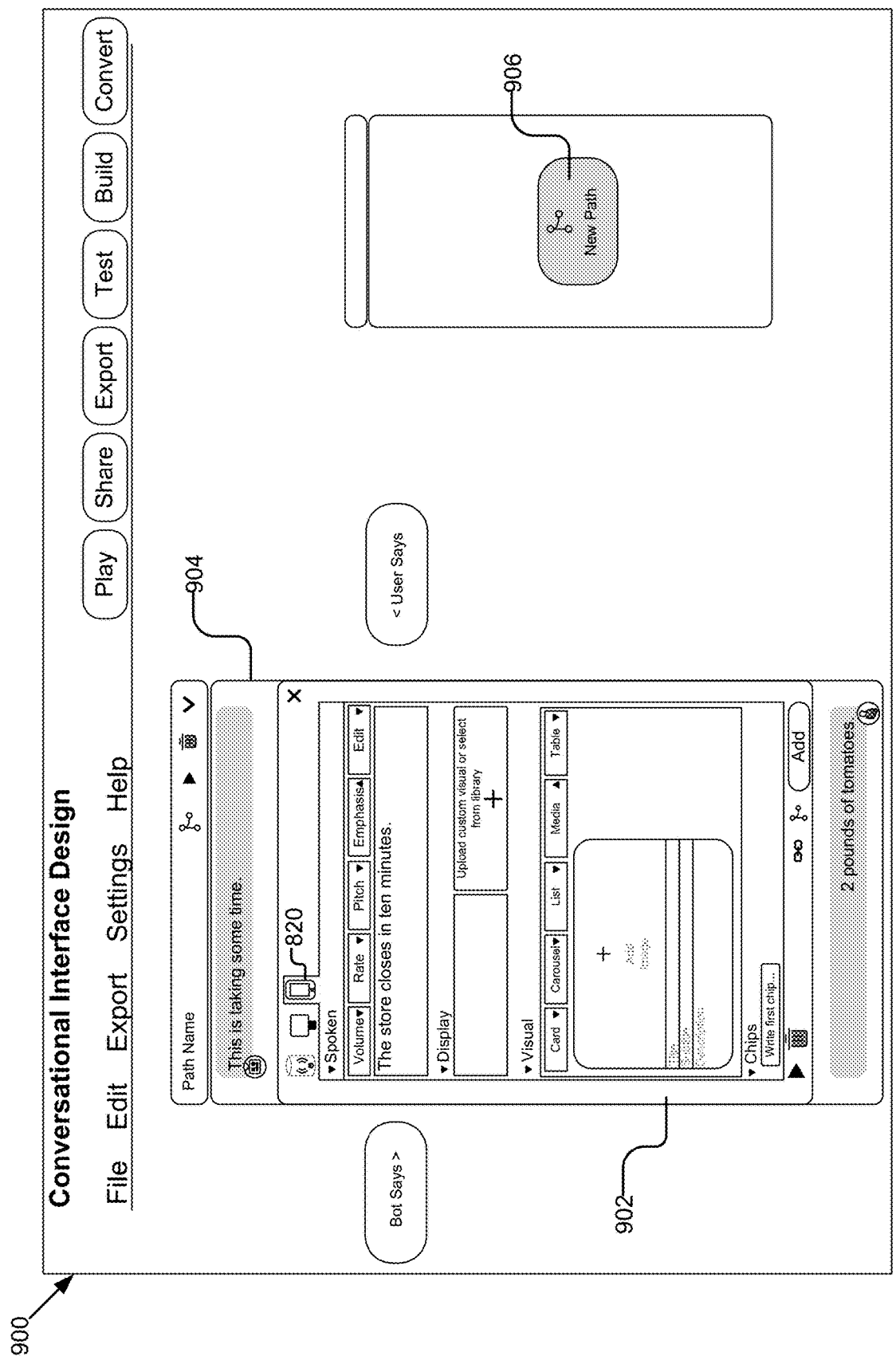
FIG. 9 shows an example graphical representation illustrating another user interface for designing a conversational interface associated with a device.

The user may then select the smartphone icon 820 in the editing portion 806 to switch the device format to smartphone and define another message object for the same interaction. FIG. 9 shows an example graphical representation of a user interface 900 for defining a message object associated with the device format of a smartphone. The user interface 900 includes the editing portion 902 where the user defines the message object associated with the smartphone. The conversational interface designer 202 associates the message objects designed for the different devices with the same interaction in the data storage 243. The user may also preview the same interaction on different devices.

In some embodiments, the user may access the user interface associated with the conversational interface designer 202 to design a different type of interaction based on a device used for accessing the conversational interface. For example, if the user is requesting information about a TV channel, a smart speaker may play an audio file to provide information on a schedule of shows and movies on the TV channel. A screen-equipped device, such as a smart display may display visual components that allow the user to watch trailers for the shows and movies scheduled on the TV channel. As such, the interaction may be different on each device due to their different capabilities. Using the FIGS. 9 and 10C as examples to illustrate the process of designing a different type of interaction on different devices, the user may select the smartphone icon 820 in the user interface 900 and design a first path 904 of interaction for the smartphone. Following that, the user may select the "New Path" button 906 to create a new path. Turning to FIG. 10C, the user may select the smart speaker icon 1044 in the user interface 1040 and design a second path 1004 of interaction for the smart speaker. The conversational interface designer 202 interprets the user actions in context and determines that user is designing different types of interaction for the smartphone and the smart speaker. The user may independently preview the first interaction on smartphone and the second interaction on the smart speaker.

In some embodiments, the user may access the user interface associated with the conversational interface designer 202 to design an interaction that transitions from one device to another device. A conversational interaction may span multiple devices and/or multiple conversational interfaces. For example, if the user requests for visual-based information in an interaction with a smart speaker device, the smart speaker device may transfer the interaction onto a screen-equipped device, such as a smartphone to deliver the visual-based information. Using the FIGS. 8A and 9 as examples to illustrate the process of designing the interaction that transitions from one device to another, the user may first define a first message object for the smart speaker and select the smartphone icon 820 to change the device format for adding a second message object in the same interaction. FIG. 9 shows the editing portion 902 indicating that the device format is changed and the user defines the second object in the editing portion 902. The conversational interface designer 202 interprets the user actions in context with respect to changing device formats in sequence and determines that a device switch is occurring in the same interaction path. In response to the request to preview the interaction, the conversational interface designer 202 adjusts the preview of the interaction by showing a notification when the interaction switches from the smart speaker to smartphone.

Referring to FIG. 2, the object generator 204 may include software and/or logic to provide functionality for generating message objects and design objects for storage in the data storage 243 and/or sharing with other components of conversational interface design application 103. Once a conversational interface design is done, in some embodiments, the conversational interface designer 202 signals the object generator 204 to generate a design object representing the design of the conversational interface. The object generator 204 may finalize and store the design locally in the memory 237 and/or in the data storage 243. In some embodiments, the object generator 204 may generate a unique identifier (ID) to associate with the design object that uniquely identifies the design object in the data storage 243. This unique ID may be utilized by other components of conversational interface design application 103 to access, share, export, and/or edit the design embodied by it. In some embodiments, when a user curates an interaction in a design of a conversational interface using the user interface associated with the conversational interface designer 202, the object generator 204 receives data related to the curation of the design, such as the message objects in the interaction, and records data describing the curation of the design (e.g., creation/editing data, creator, design object ID, timestamp of curation, etc.) as design history 226. In a further example, as the design of conversational interface is worked on by the same or other authorized users, the object generator 204 logs each instance of the design being edited in the data storage 243 as design history 226.

In some embodiments, the nature of the message object generated by the object generator 204 may be determined based on the message formats supported by the application platforms (e.g., messaging applications, social network applications, business applications, etc.) and/or device capabilities supported by different types of devices carrying the conversational interaction. The message object also includes metadata describing the corresponding message content. The metadata includes data necessary for reconstruction in the preview. For example, metadata may include, but not limited to, device format, message format, preview time duration, author, comment or annotation, links, design elements (e.g., graphical images, sound file, etc.), interaction data, etc.

Figure 6A:
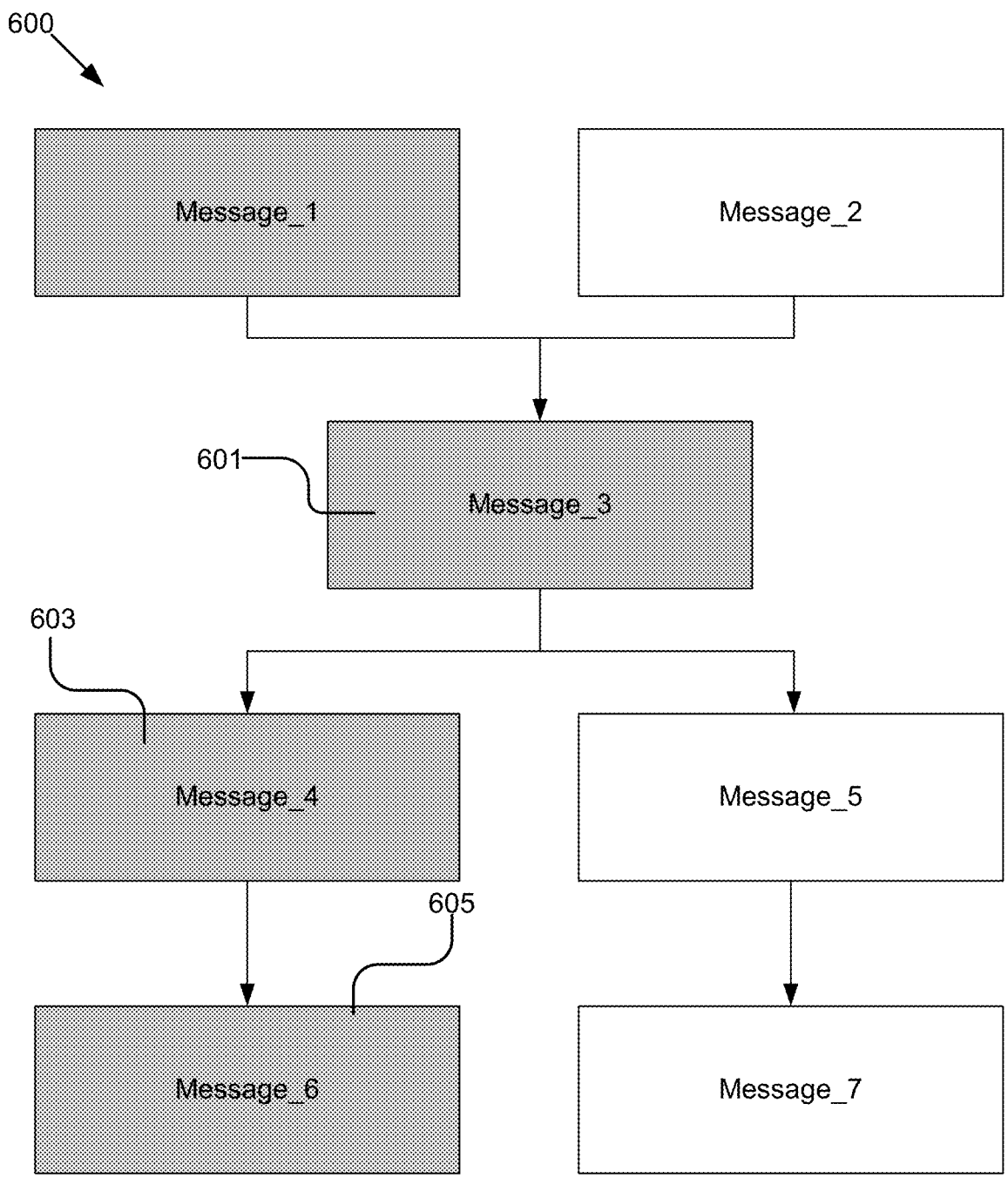
FIGS. 6A-6L show example graphical representations illustrating embodiments for manipulating a structure of a conversational interaction in a conversational interface.
Figure 6B:
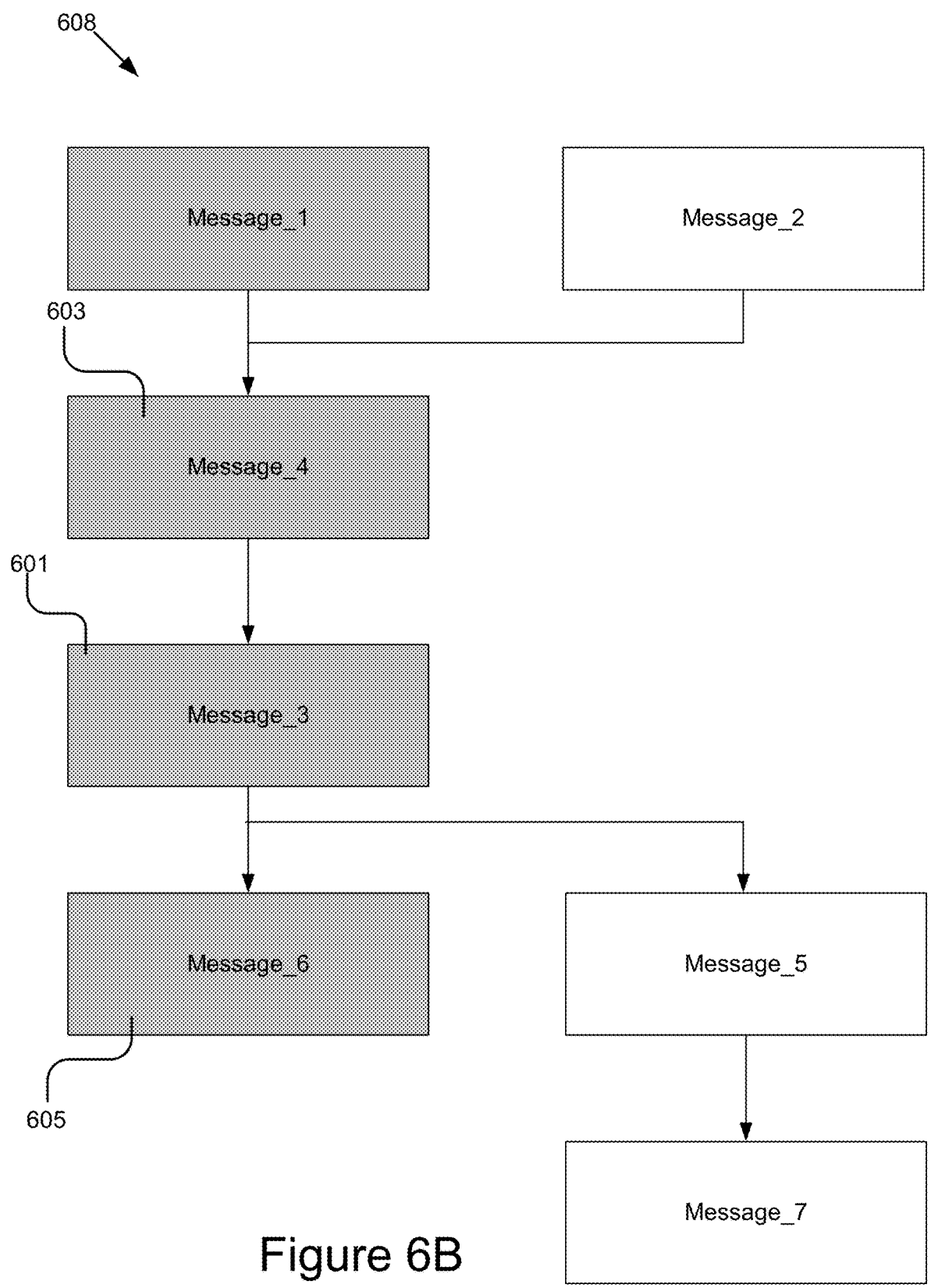
Figure 6C:
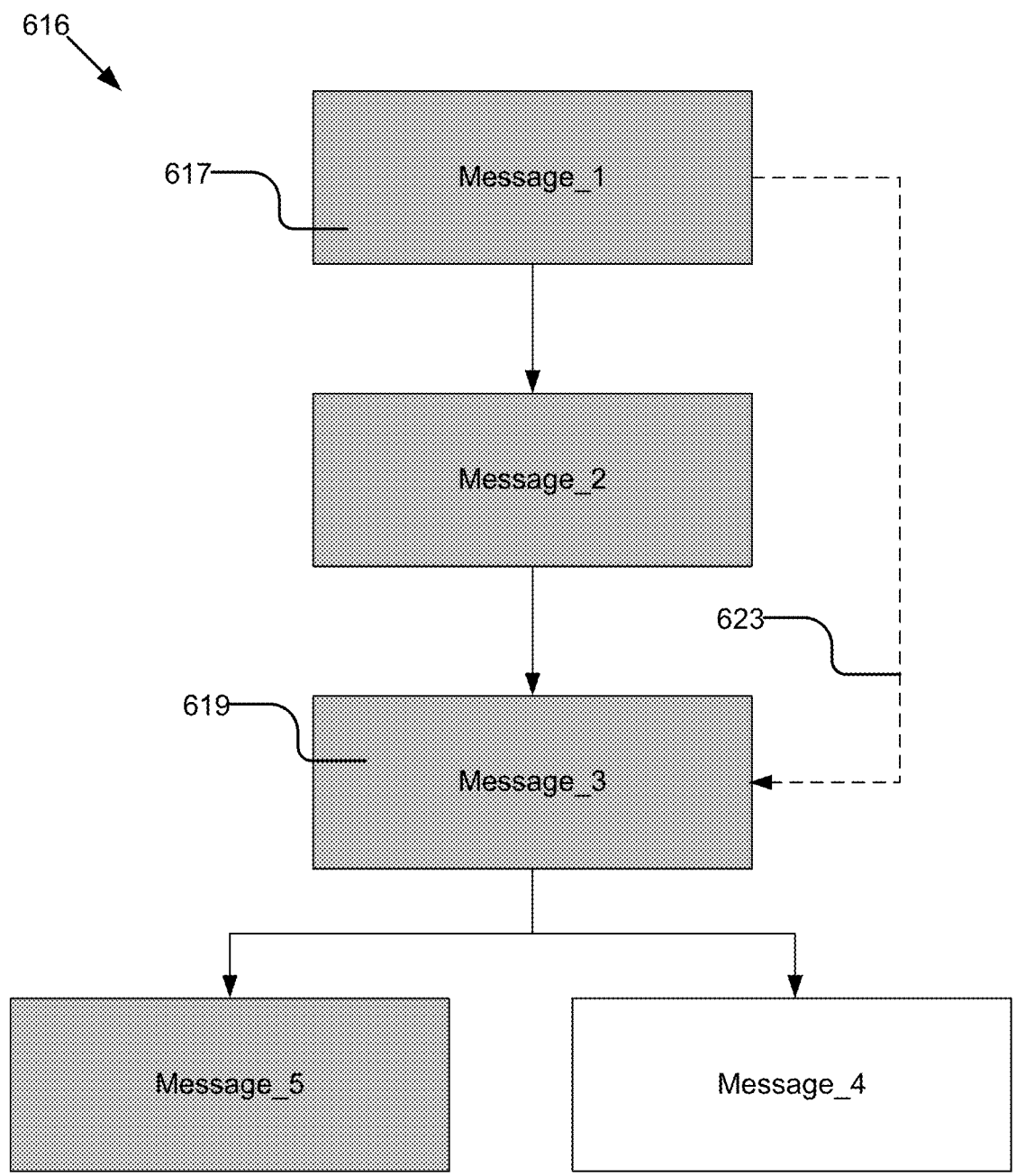
Figure 6D:
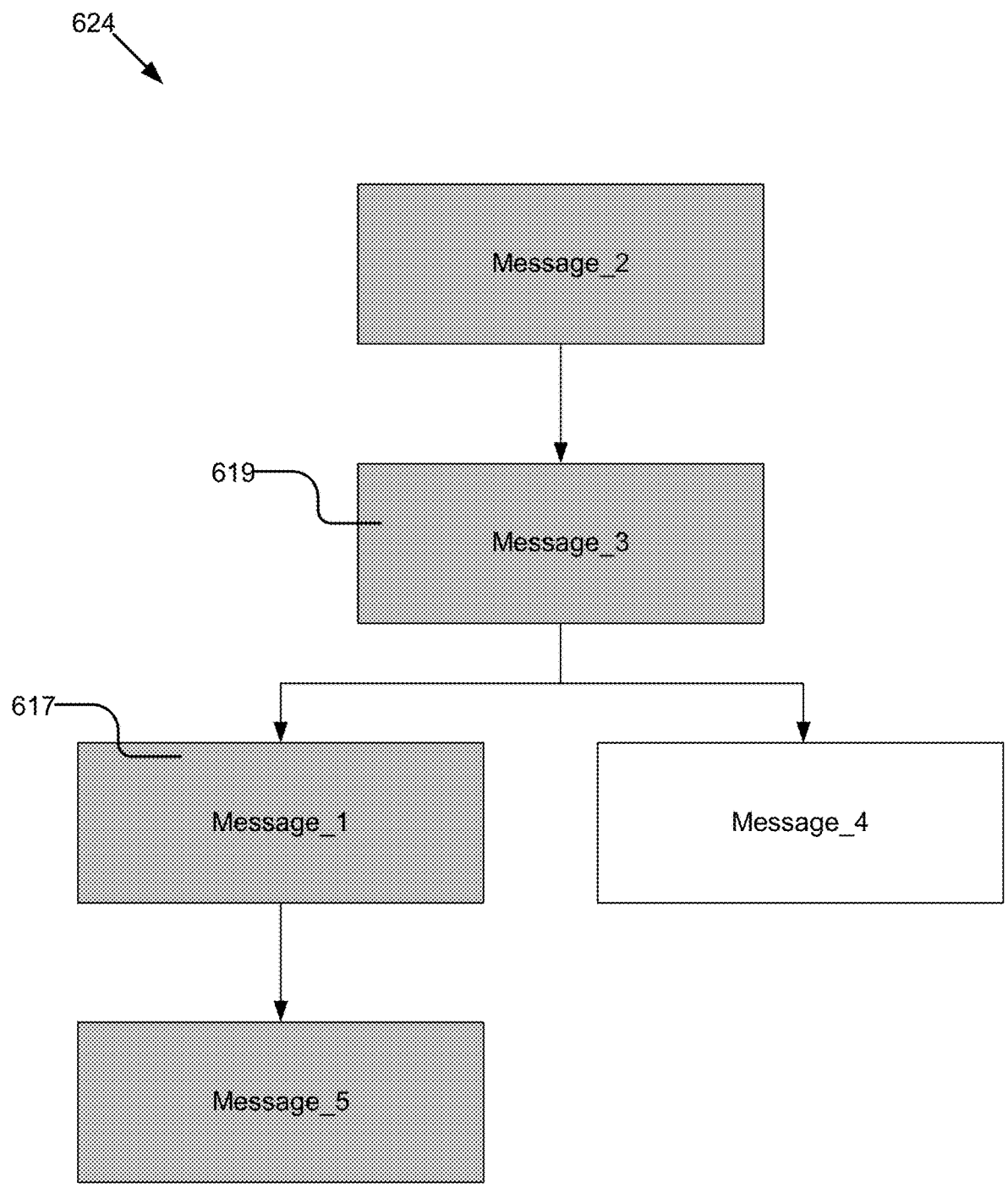

The visualizer 206 may include software and/or logic to provide functionality for constructing a visualization of the interaction in the design of the conversational interface using the message objects and/or design objects generated by the object generator 204. The visualizer 206 may be coupled to the data storage 243 to store, update, delete, and/or otherwise manipulate the visualization data in the design history 226. For example, the visualization may be a flowchart representation of the interaction. Referring to FIGS. 6A-6L, the example graphical representations illustrate embodiments for manipulating a structure of the conversational interaction in a conversational interface. In FIG. 6A, the graphical representation 600 shows a flowchart visualization of the conversational interaction or experience in a conversational interface. The flowchart is a diagram of a flow of conversational interaction in the conversational interface. The messages highlighted in grey in FIGS. 6A-6L represent the messages viewable for manipulating by the user in the preview portion of the user interface. As shown in FIG. 6A, when the user moves Message_3 601 to place it between Message_4 603 and Message_6 605 in the preview portion, the visualizer 206 automatically determines the reorganization of the messages and updates the connections between the messages in the flowchart visualization. In FIG. 6B, the graphical representation 608 illustrates the reorganization of the connections between the messages in response to the user selecting, dragging, and dropping the Message_3 601 between Message_4 603 and Message_6 605 in the preview portion. In some embodiments, the visualizer 206 determines connections between messages that are far apart from each other. For example, the connections can be links between the far apart messages. Links may be a subset of the connections. In FIG. 6C, the graphical representation 616 illustrates a link 623 between Message_1 617 and Message_3 619. Links are weaker than the connections. For example, when the user selects, drags, and drops Message_1 617 after Message_3 619, the visualizer 206 automatically deletes the link 623 as it would cause an infinite loop between the two messages. In FIG. 6D, the graphical representation 624 illustrates the deletion of the link 623 between Message_1 617 and Message_3 619 and a reorganization of the other connections between the messages in response to the user moving the Message_1 617 after Message_3 619.

Figure 6E:
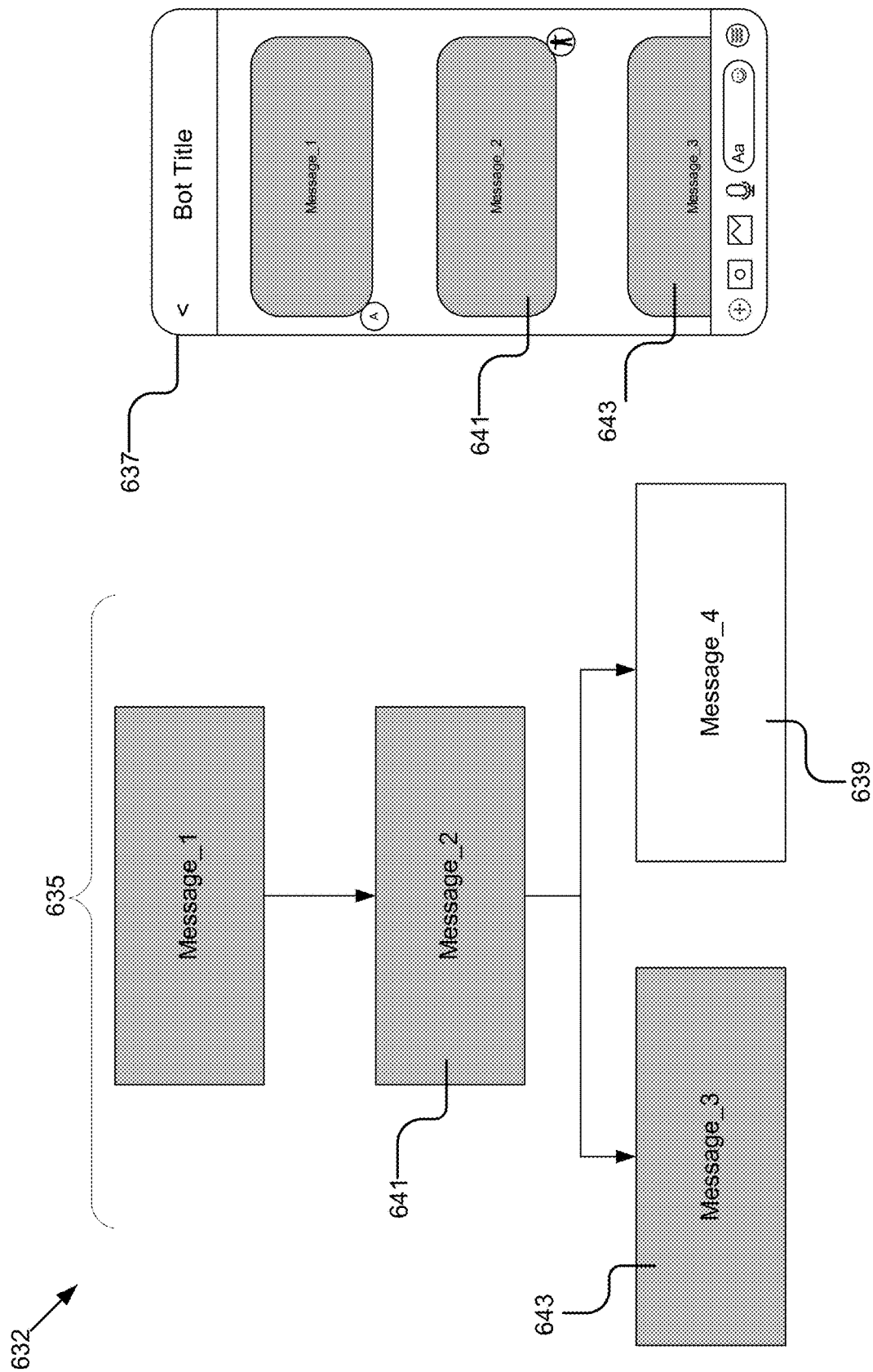
Figure 6F:
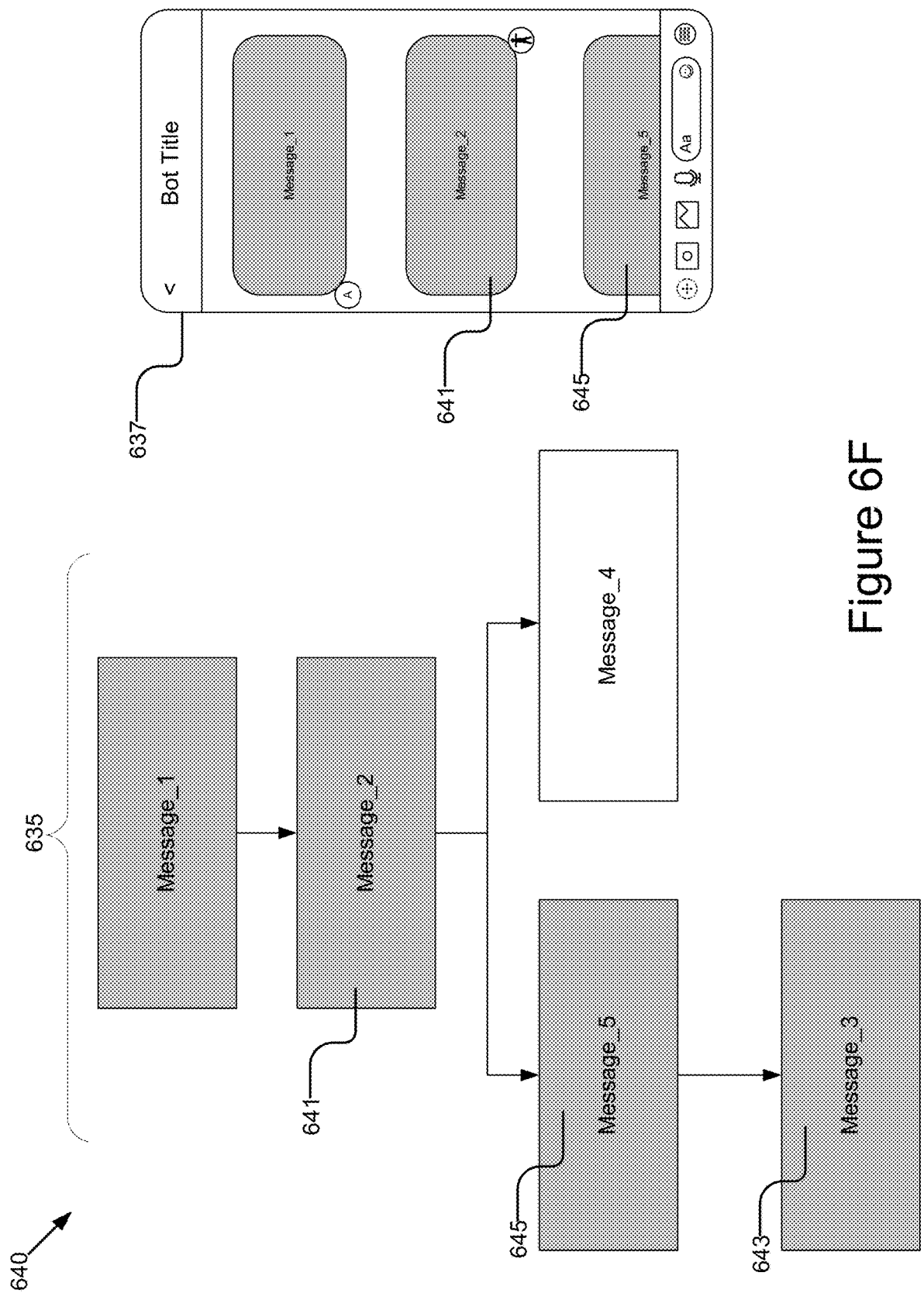

Another example of user manipulation of the interaction in the conversational interface is adding messages in the preview portion. FIG. 6E is a graphical representation 632 illustrating the flowchart visualization 635 and the preview portion 637 in the editor for conversational interface design placed side by side. The messages shown within the preview portion 637 of the conversational interface are highlighted in the flowchart visualization 635. Message_4 639 is not highlighted in grey because it is not shown or visible to the user in the preview portion 637 and Message_3 643 is highlighted because it is partially shown in the preview portion 637. In the graphical representation 640 of FIG. 6F, when the user adds Message_5 645 in the preview portion 637, the visualizer 206 determines that Message_3 643 is shown partially in the preview 637 in FIG. 6E and that the user is attempting to add the Message_5 645 after Message_2 641. Accordingly, the visualizer 206 adds the Message_5 645 to flowchart visualization 635 and rearranges the connections between Message_2 641, Message_3 643, and Message_4 639 (even though Message_4 639 is not shown to the user in the preview portion 637).

Figure 6G:
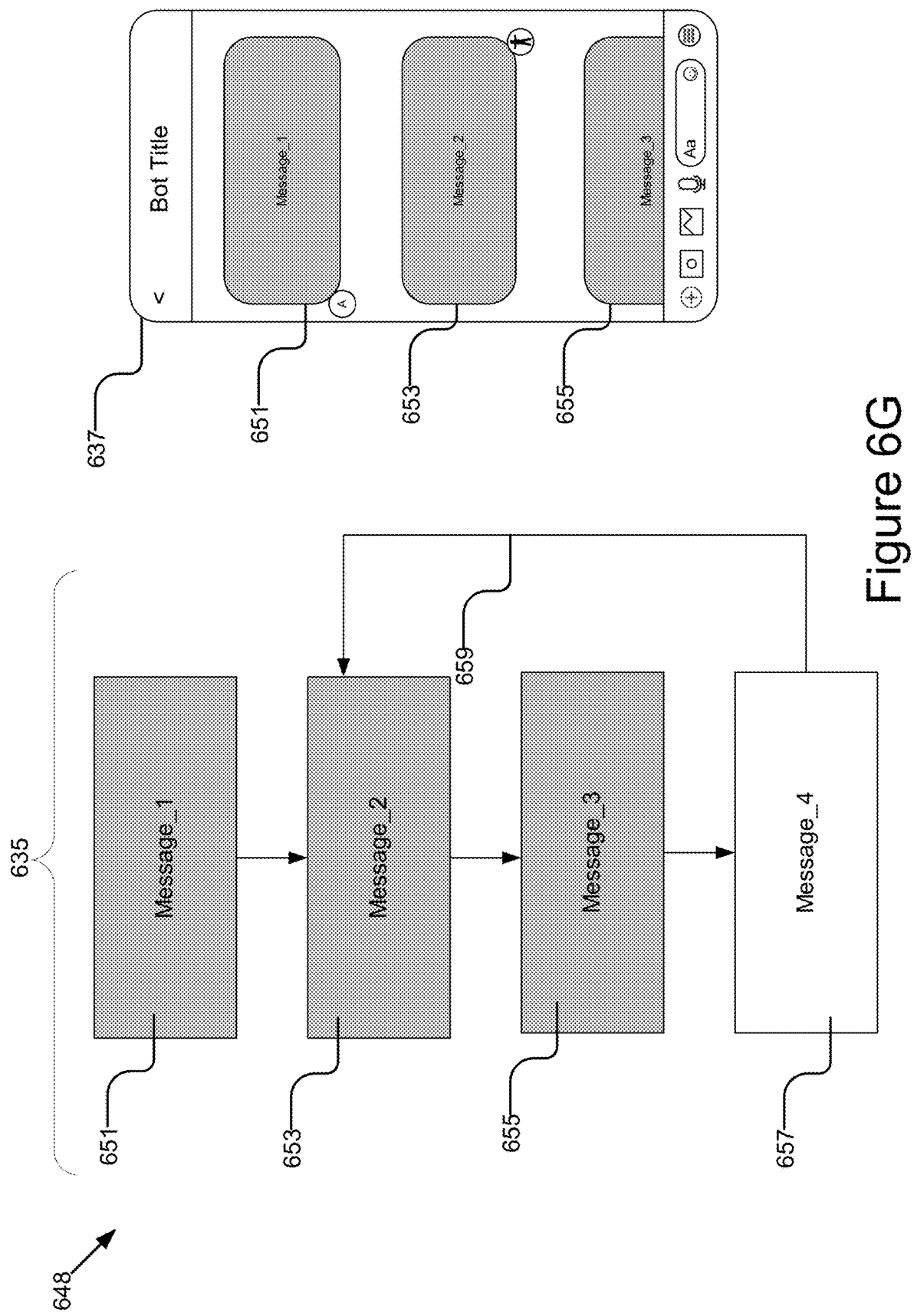
Figure 6H:
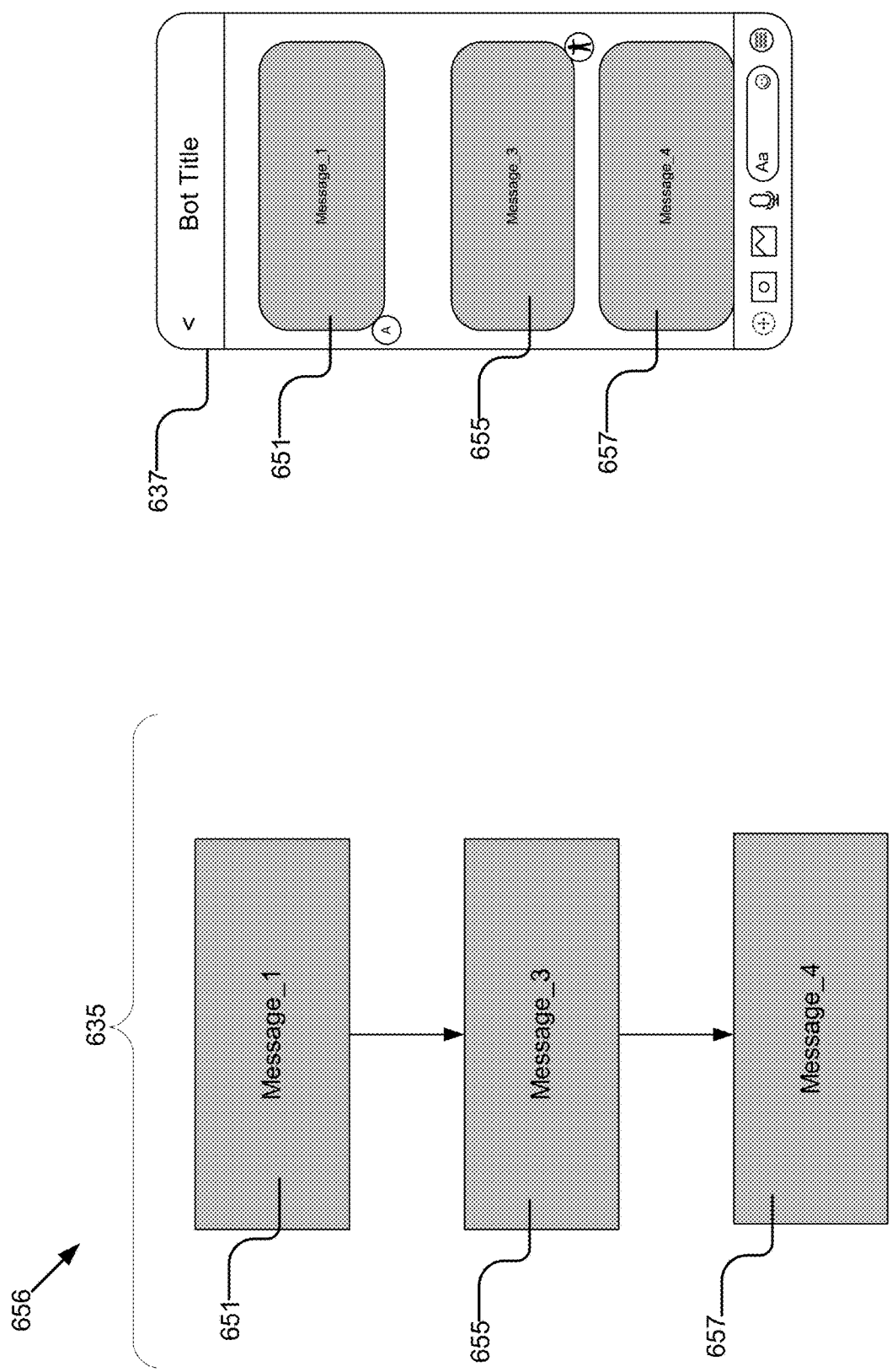

Another example of user manipulation of the interaction in the conversational interface is deleting messages in the preview portion. In FIG. 6G, the graphical representation 648 illustrates a series of messages connected in a single path in the flowchart visualization 635. Message_1 651 is connected to Message_2 653 and Message_2 653 is connected to Message_3 655 and which in turn is connected to Message_4 657. When the user deletes Message_2 653 in the preview portion 637, the visualizer 206 determines that Message_2 653 has an outgoing connection to Message_3 655 and incoming link 659 from Message_4 657 and automatically reorganizes the connections by connecting Message_1 651 to Message_3 655 and removing the link 659. As shown in the graphical representation 656 of FIG. 6H, Message_4 657 becomes visible in the preview portion 637 to the user due to the deletion of Message_2 653.

Figure 6I:
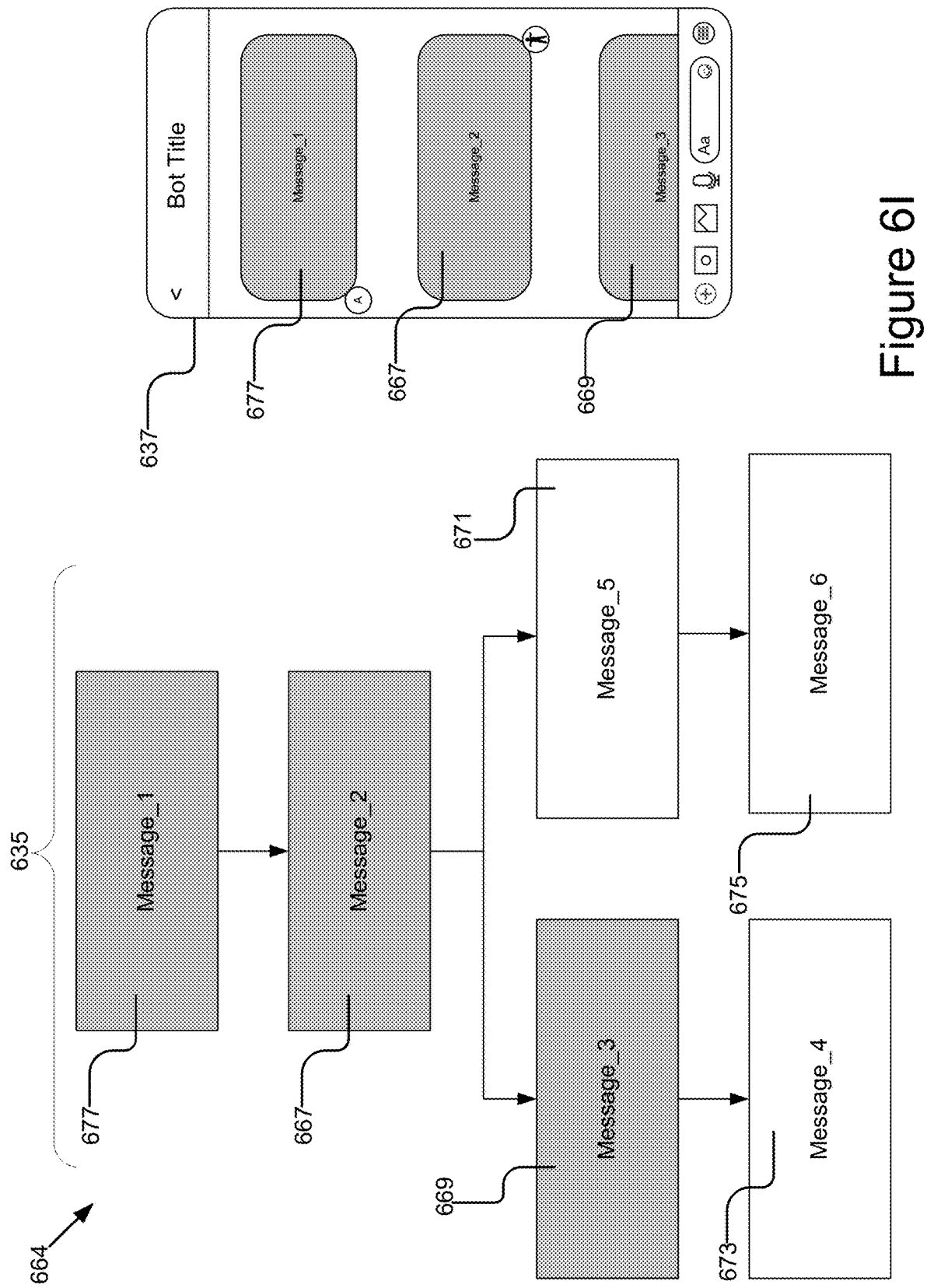
Figure 6J:
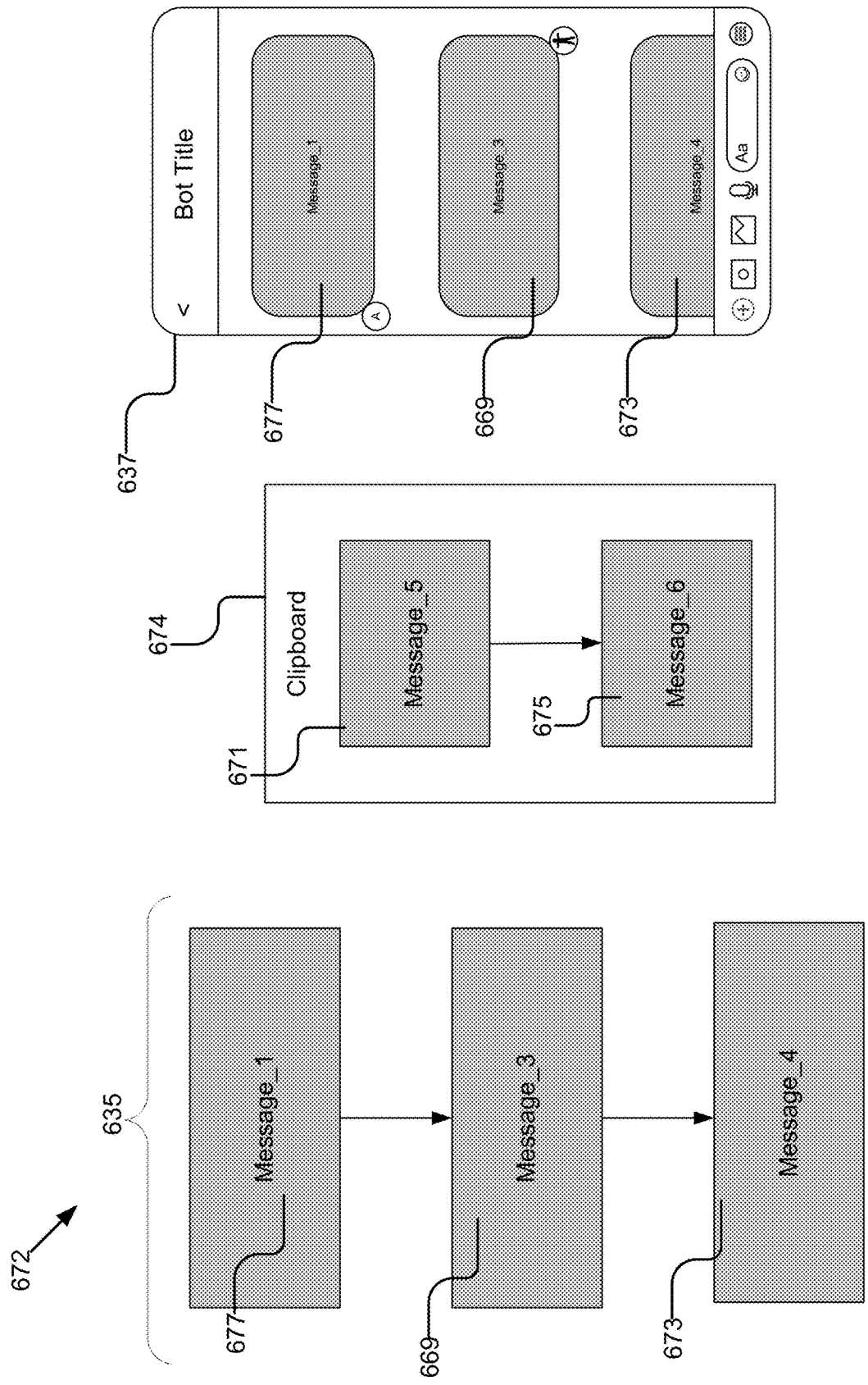

FIG. 6I is a graphical representation 664 illustrating a series of messages connected in multiple branching paths in the flowchart visualization 635. Message_2 667 has two outgoing connections, one to Message_3 669 and one to Message_5 671. Message_3 669 has its outgoing connection to Message_4 673 and Message_5 671 has its outgoing connection to Message_6 675. When the user deletes Message_2 667 in the preview portion 637, the visualizer 206 determines that the connection of Message_2 667 to Message_3 669 is important as it is shown to the user in the preview portion 637 and therefore preserves that outgoing connection by making it the connection out of Message_1 677 to Message_3 669. This reorganization prevents Message_1 677 from having multiple outgoing paths that the user did not intend. An example of Message_1 677 may be a statement and an example of Message_2 667 may be a question that supports multiple outgoing connections. As shown in graphical representation 672 of FIG. 6J, the visualizer 206 removes Message_2 667 and connects Message_1 677 to Message_3 669. Due to the deletion, Message_4 657 becomes visible in the preview portion 637 to the user. The visualizer 206 places Message_5 671 and its connected Message_6 675 in the clipboard 674 as an orphan path. Based on user selection, the visualizer 206 can delete the orphan path or bring it back in to the conversational interface design.

Figure 6K:
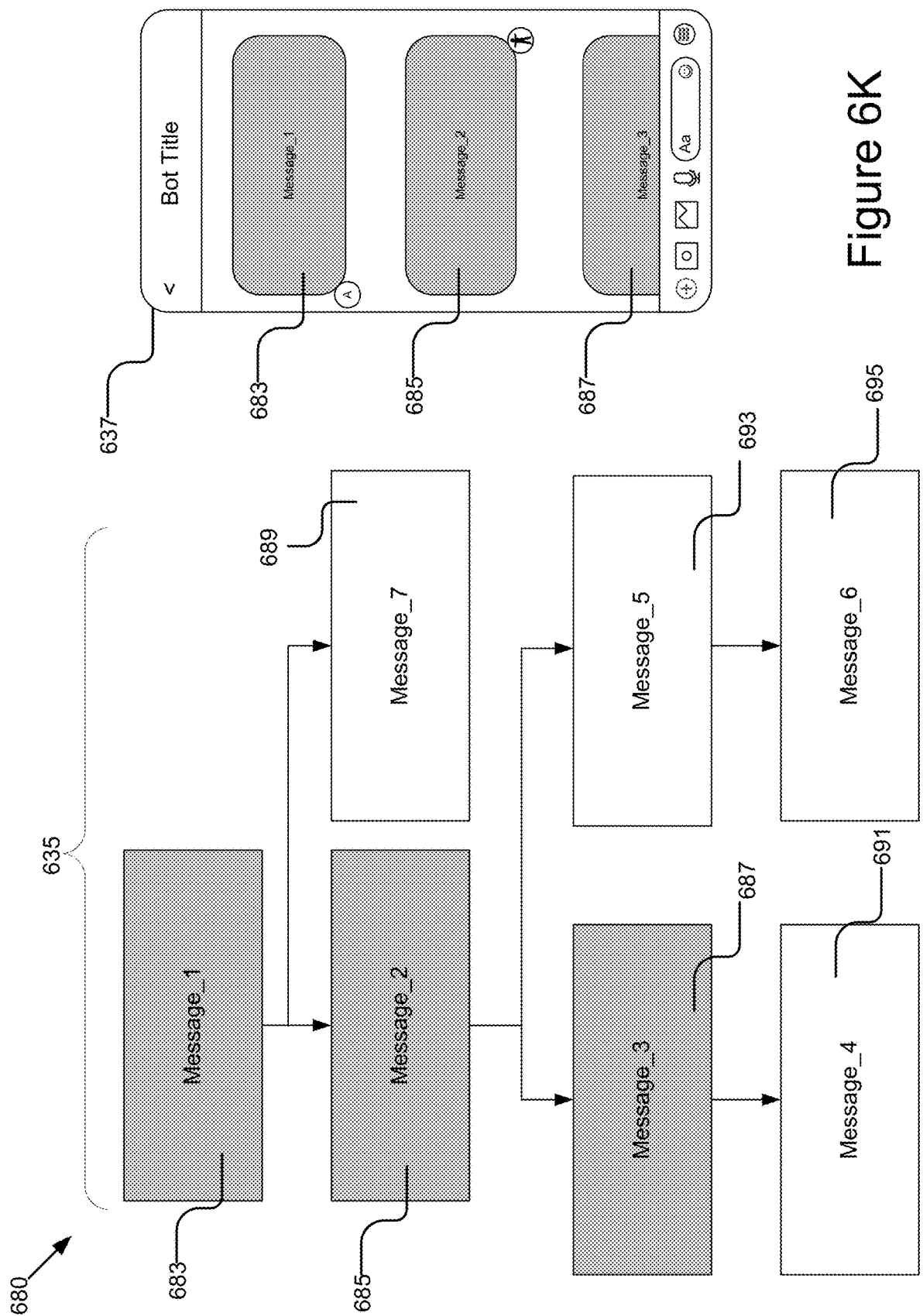
Figure 6L:
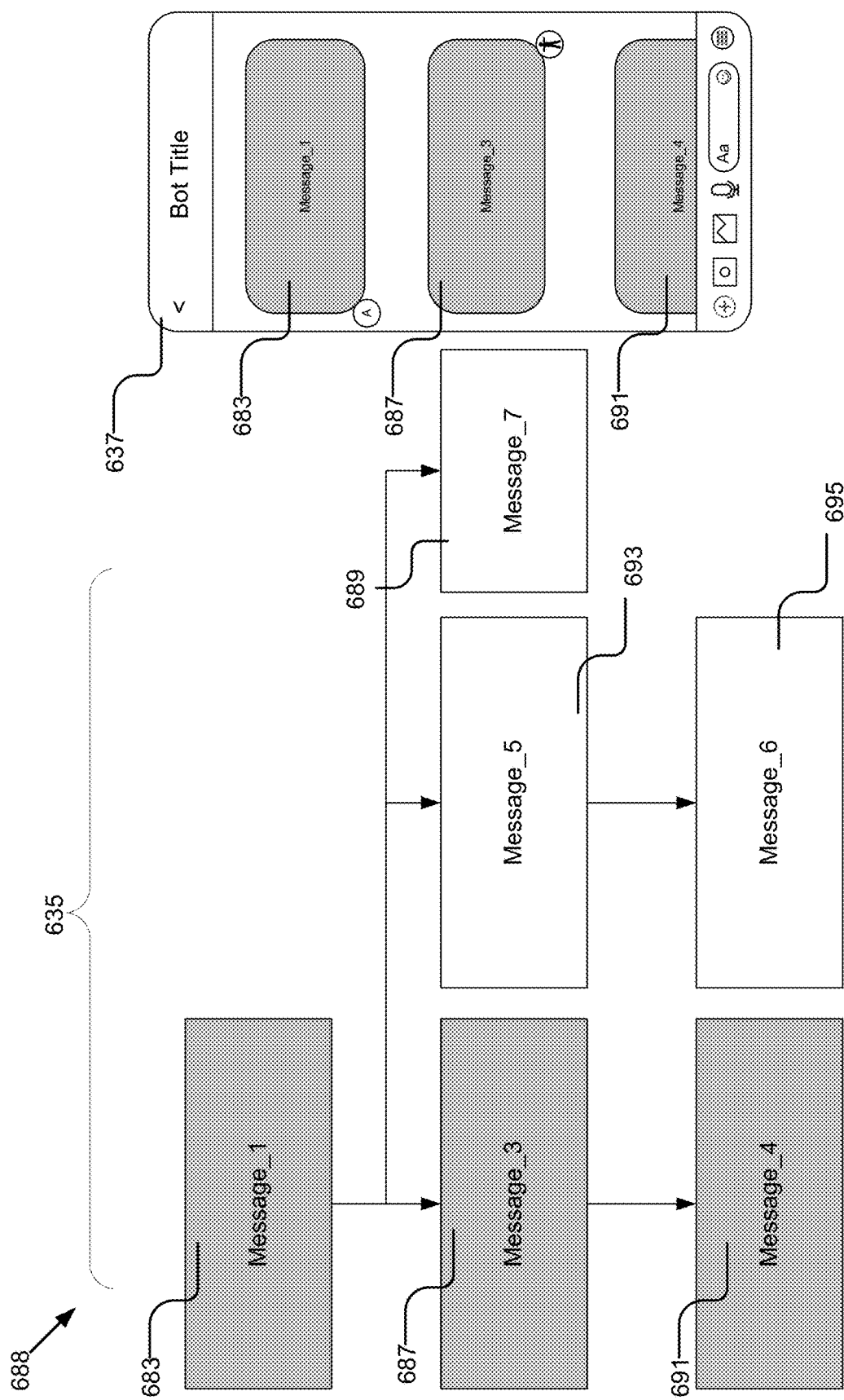

FIG. 6K is another graphical representation 680 illustrating a series of messages connected in multiple branching paths in the flowchart visualization 635. Message_1 683 has two outgoing connections, one to Message_2 685 and one to Message_7 689. Message_2 685 has two outgoing connections, one to Message_3 687 and Message_5 693. When the user deletes Message_2 685 in the preview portion 637, the visualizer 206 reorganizes the connections without using the clipboard as shown in the graphical representation 688 of FIG. 6L.

Figure 11:
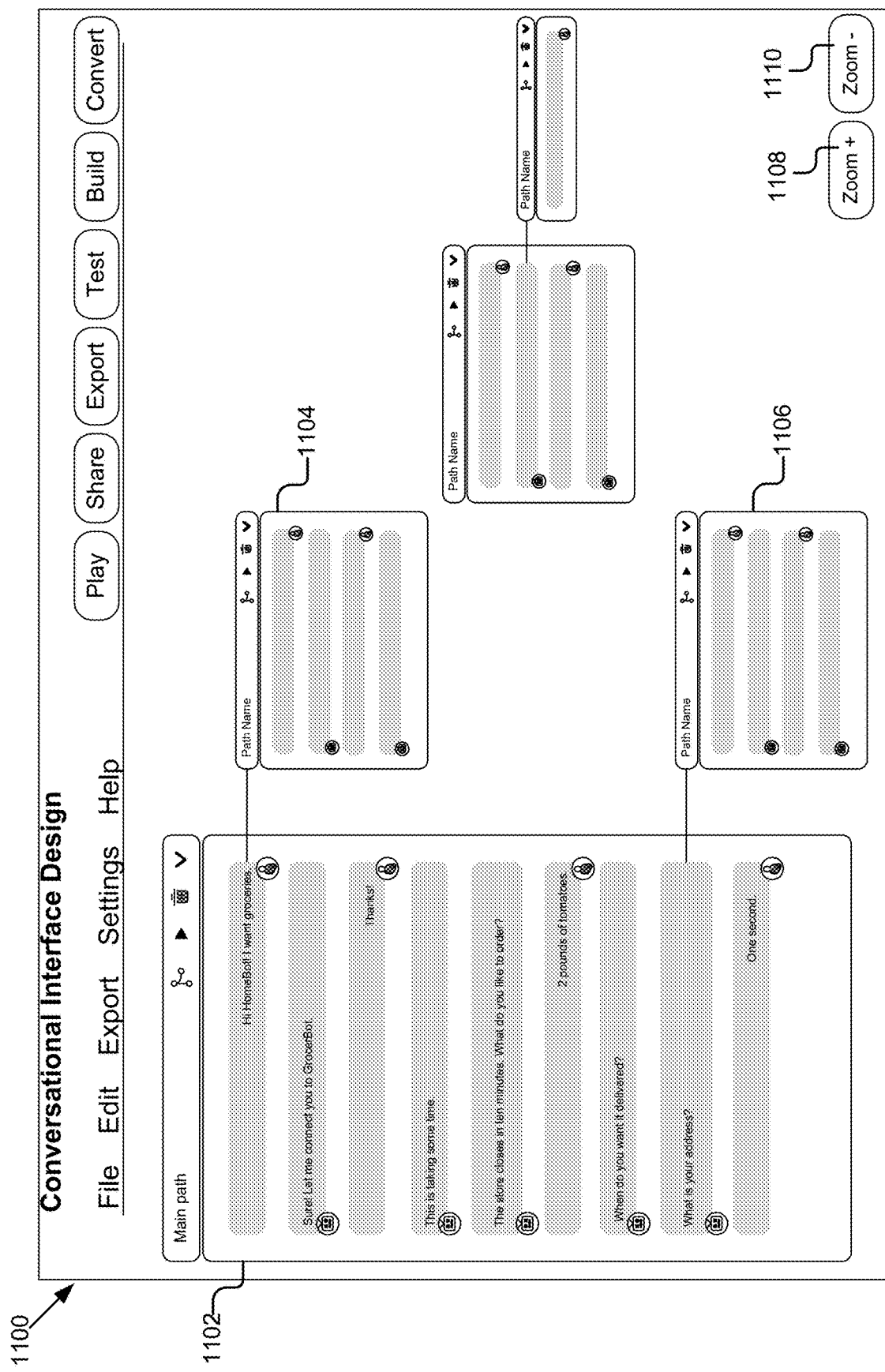
FIG. 11 shows an example graphical representation illustrating a user interface for displaying a visualization of the conversational interaction in a design.

In another example, the visualization generated by the visualizer 206 may be an elevated view (e.g., a bird's eye view) of the mapping of different interaction paths in the design. Referring to FIG. 11, the example graphical representation illustrates a user interface 1100 for displaying a visualization of the conversational interaction in a design. The user interface 1100 depicts the main path 1102 on the top level, and the sub-paths 1104 and 1106 on the immediate right of the main path 1102. The user may zoom in and zoom out to have a bird's eye view of the interaction by selecting the buttons 1108 and 1110. The position of the main path 1102 and the sub-paths 1104 and 1106 is defined by their connection to messages in other paths. In this way, the complex interaction paths may be navigated by the user with ease.

The design manager 208 may include software and/or logic to provide functionality for managing conversational interface designs created by users, receive and store the designs, share the designs, retrieve and provide the designs to users for viewing, editing, and/or annotating, etc. For example, the design of the conversational interface may be a group effort where a group of users collaborate on the design. In some embodiments, the design manager 208 may receive and provide conversational interface design-related data, and cooperate with other components of the conversational interface design application 103 to create conversational interfaces based on input provided by the users. The design manager 208 may be coupled to the data storage 243 to store various types of design templates 230 for conversational interfaces in existing technology services (e.g., messaging, social networking, virtual assistant, etc.) and associated visual components used in conversation design for those conversational interfaces. In a further example, the design manager 208 may retrieve, store, update, delete, and/or otherwise manipulate message objects 222, design objects 224, design templates 230, and/or other data related to the acts and/or functionality that it performs.

In some embodiments, the design manager 208 may transmit instances of designs to the conversational interface designer 202 for viewing, editing, and sharing with other users. The design manager 208 may receive user request to share a design of a conversational interface with others and facilitates the processing of such user requests. The user may select via the user interface of the conversational interface designer 202 to share and/or export the conversational interface designs, and responsive thereto, the conversational interface designer 202 may signal the design manager 208 to share and/or export the designs. For example, the user can export the conversational experience associated with the conversational user interface in a suitable format (e.g., AVI, MP4, GIF, etc.) and share with other users. In another example, the user can export the conversational experience to Microsoft™ Excel or Adobe™ PDF.

The user interface engine 210 may include software and/or logic for providing user interfaces to a user. In some embodiments, the user interface engine 210 receives instructions from the conversational interface designer 202, generates a user interface for designing the conversational interface, and transmits the user interface for display on the client device 115. In some embodiments, the user interface engine 210 receives instructions from the visualizer 206, generates a user interface for visualizing the interaction paths in a design of the conversational interface, and transmits the user interface for display on the client device 115. In some embodiments, the user interface engine 210 sends graphical user interface data to an application (e.g., a browser) in the client device 115 via the communication unit 241 causing the application to display the data as a graphical user interface.

Figure 12:
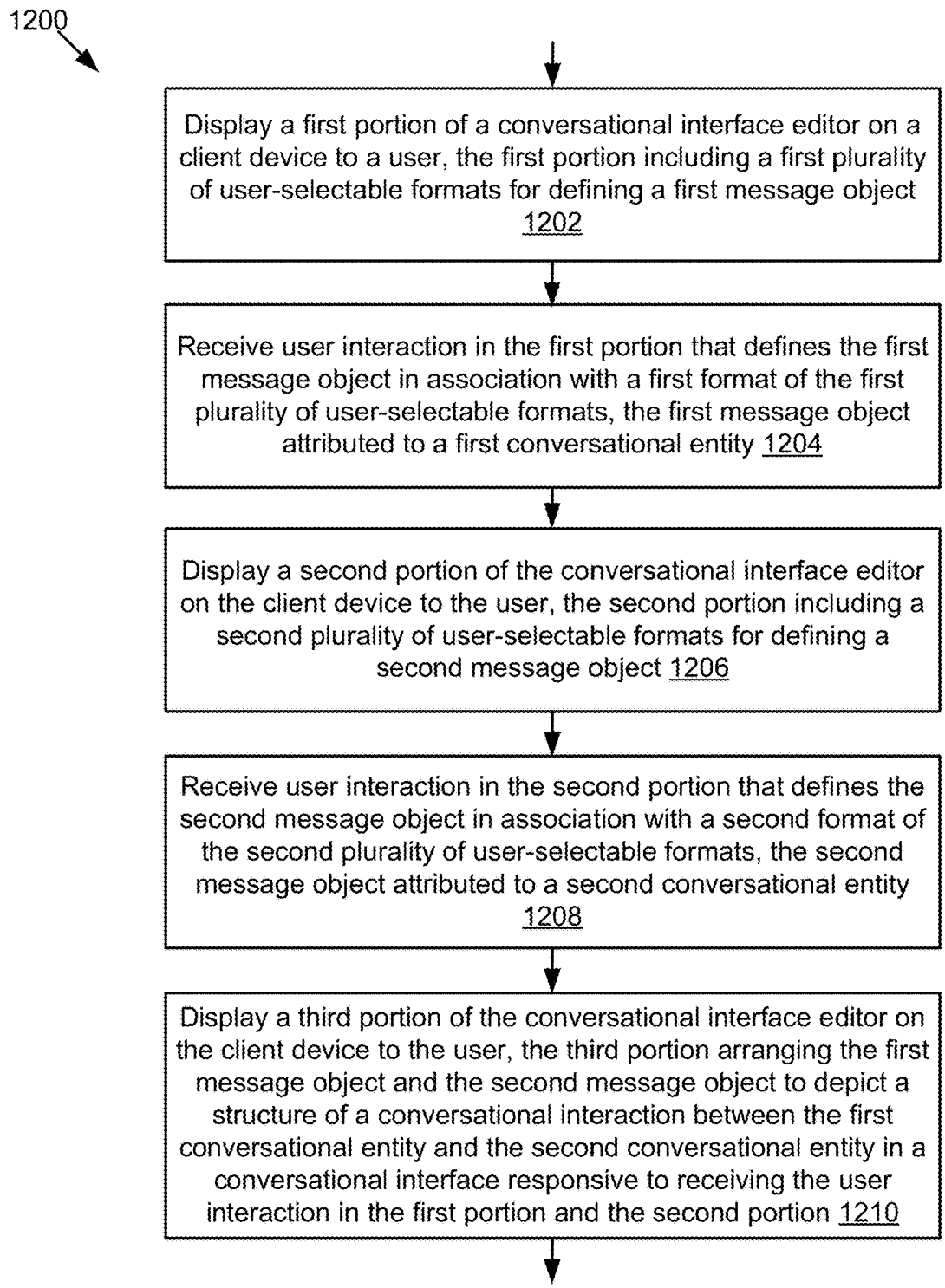
FIG. 12 is a flow diagram illustrating one embodiment of an example method for designing a conversational interface.

FIG. 12 is a flow diagram illustrating one embodiment of an example method 1200 for designing a conversational interface. At 1202, the conversational interface designer 202 displays a first portion of a conversational interface editor on a client device to a user, the first portion including a first plurality of user-selectable formats for defining a first message object. At 1204, the conversational interface designer 202 receives user interaction in the first portion that defines the first message object in association with a first format of the first plurality of user-selectable formats, the first message object attributed to a first conversational entity. At 1206, the conversational interface designer 202 displays a second portion of the conversational interface editor on the client device to the user, the second portion including a second plurality of user-selectable formats for defining a second message object. At 1208, the conversational interface designer 202 receives user interaction in the second portion that defines the second message object in association with a second format of the second plurality of user-selectable formats, the second message object attributed to a second conversational entity. At 1210, the conversational interface designer 202 displays a third portion of the conversational interface editor on the client device to the user, the third portion arranging the first message object and the second message object to depict a structure of a conversational interaction between the first conversational entity and the second conversational entity in a conversational interface responsive to receiving the user interaction in the first portion and the second portion.

Figure 13:
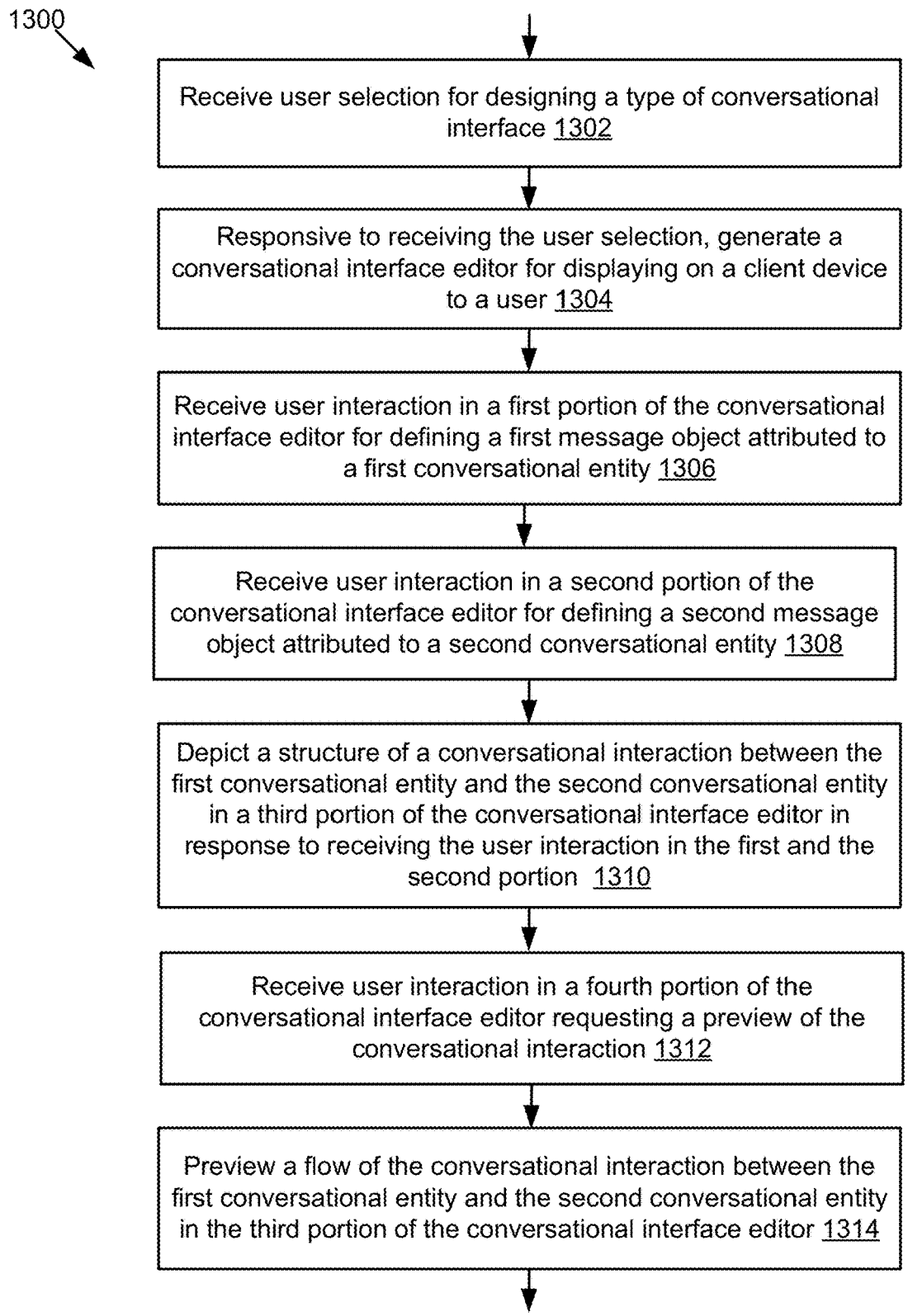
FIG. 13 is a flow diagram illustrating one embodiment of another example method for designing a conversational interface.

FIG. 13 is a flow diagram illustrating one embodiment of another example method 1300 for designing a conversational interface. At 1302, the conversational interface designer 202 receives user selection for designing a type of conversational interface. At 1304, the conversational interface designer 202 generates a conversational interface editor for displaying on a client device to a user responsive to receiving the user selection. At 1306, the conversational interface designer 202 receives user interaction in a first portion of the conversational interface editor for defining a first message object attributed to a first conversational entity. At 1308, the conversational interface designer 202 receives user interaction in a second portion of the conversational interface editor for defining a second message object attributed to a second conversational entity. At 1310, the conversational interface designer 202 depicts a structure of a conversational interaction between the first conversational entity and the second conversational entity in a third portion of the conversational interface editor in response to receiving the user interaction in the first and the second portion. At 1312, the conversational interface designer 202 receives user interaction in a fourth portion of the conversational interface editor requesting a preview of the conversational interaction. At 1314, the conversational interface designer 202 previews a flow of the conversational interaction between the first conversational entity and the second conversational entity in the third portion of the conversational interface editor.

Figure 14:
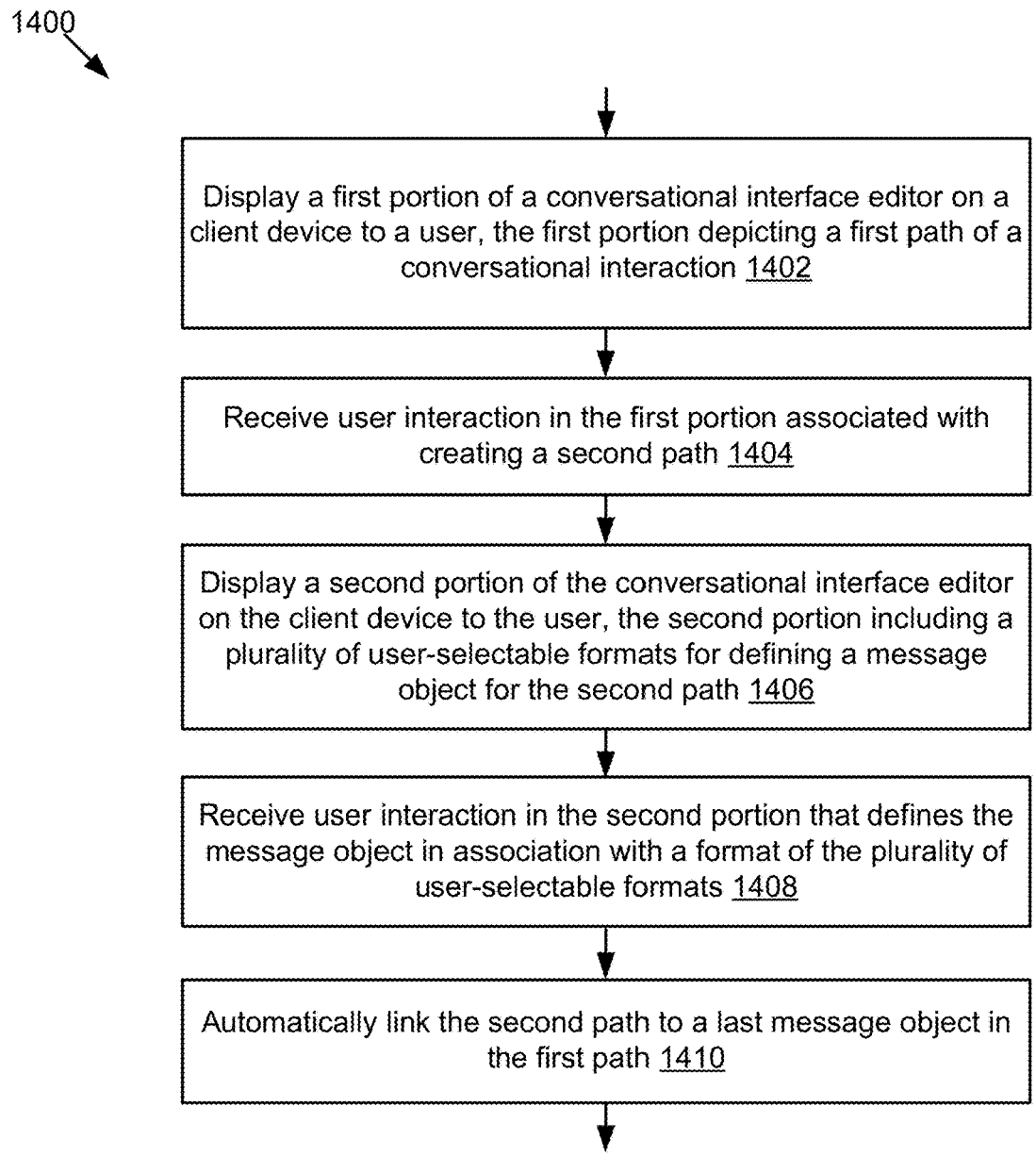
FIG. 14 is a flow diagram illustrating one embodiment of an example method for creating a path in a design of the conversational interface.

FIG. 14 is a flow diagram illustrating one embodiment of an example method 1400 for creating a path in a design of the conversational interface. At 1402, the conversational interface designer 202 displays a first portion of a conversational interface editor on a client device to a user, the first portion depicting a first path of a conversational interaction. At 1404, the conversational interface designer 202 receives user interaction in the first portion associated with creating a second path. At 1406, the conversational interface designer 202 displays a second portion of the conversational interface editor on the client device to the user, the second portion including a plurality of user-selectable formats for defining a message object for the second path. At 1408, the conversational interface designer 202 receives user interaction in the second portion that defines the message object in association with a format of the plurality of user-selectable formats. At 1410, the conversational interface designer 202 automatically links the second path to a last message object in the first path.

A system and method for designing a conversational interface has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   displaying, using one or more processors, a first portion of a conversational interface editor on a client device to a user, the first portion including a first plurality of user-selectable formats for defining a first message object;
   receiving, using the one or more processors, user interaction in the first portion that defines the first message object in association with a first format of the first plurality of user-selectable formats, the first message object attributed to a first conversational entity;
   displaying, using the one or more processors, a second portion of the conversational interface editor on the client device to the user, the second portion including a second plurality of user-selectable formats for defining a second message object;
   receiving, using the one or more processors, user interaction in the second portion that defines the second message object in association with a second format of the second plurality of user-selectable formats, the second message object attributed to a second conversational entity; and displaying, using the one or more processors, a third portion of the conversational interface editor on the client device to the user, the third portion arranging the first message object and the second message object to depict a structure of a conversational interaction between the first conversational entity and the second conversational entity in a conversational interface responsive to receiving the user interaction in the first portion and the second portion.

2. The computer-implemented method of claim 1, further comprising:

receiving user selection for designing a type of conversational interface; and responsive to receiving the user selection, generating the conversational interface editor for displaying on the client device to the user, the conversational interface editor matching the type of conversational interface selected for designing.

3. The computer-implemented method of claim 2, wherein the type of conversational interface is one from a group of text-based conversational interface, voice-based conversational interface, and image-based conversational interface.

4. The computer-implemented method of claim 1, further comprising:

displaying a fourth portion of the conversational interface editor on the client device to the user, the fourth portion including a plurality of user-selectable graphical elements for interacting with a design of the conversational interface;

receiving user interaction in the fourth portion selecting a first user-selectable graphical element to request a preview of the conversational interaction; and responsive to receiving the user interaction in the fourth portion selecting the first user-selectable graphical element, previewing a flow of the conversational interaction between the first conversational entity and the second conversational entity in the conversational interface depicted in the third portion.

5. The computer-implemented method of claim 4, further comprising:

receiving user interaction in the fourth portion selecting a second user-selectable graphical element to request a visualization of the flow of the conversational interaction; and responsive to receiving the user interaction in the fourth portion selecting the second user-selectable graphical element, displaying a fifth portion of the conversational interface editor on the client device to the user, the fifth portion depicting the visualization.

6. The computer-implemented method of claim 5, further comprising:

receiving user interaction in the third portion associated with manipulating one or more of the first message object and the second message object; and responsive to receiving the user interaction in the third portion, updating the visualization of the flow of the conversational interaction.

7. The computer-implemented method of claim 6, wherein manipulating the one or more of the first message object and the second message object comprises one from a group of moving, reordering, editing, deleting, cloning, and creating a new path.

8. The computer-implemented method of claim 1, further comprising:

receiving user interaction in the third portion associated with creating a new path of the conversational interaction;

displaying a sixth portion of the conversational interface editor on the client device to the user, the sixth portion depicting the new path of the conversational interaction responsive to receiving the user interaction in the first portion and the second portion; and automatically linking the new path to a last message object of the first message object and the second message object in the third portion.

9. The computer-implemented method of claim 1, wherein one of the first format and the second format is a device format from a group of smart speaker, headphones, smart display, television, laptop, smartphone, and smartwatch.

10. The computer-implemented method of claim 1, wherein one of the first format and the second format is a message format from a group of audio, textual, speech synthesis markup language object, image, text, lists, buttons, cards, suggestions, and carousel.

11. The computer-implemented method of claim 1, wherein the first portion of the conversational interface editor is inlaid within the third portion of the conversational interface editor responsive to receiving the user interaction in the first portion.

12. The computer-implemented method of claim 1, wherein the second portion of the conversational interface editor is inlaid within the third portion of the conversational interface editor responsive to receiving the user interaction in the second portion.

13. A system comprising:

one or more processors; and a memory, the memory storing instructions, which when executed cause the one or more processors to:

display a first portion of a conversational interface editor on a client device to a user, the first portion including a first plurality of user-selectable formats for defining a first message object;

receive user interaction in the first portion that defines the first message object in association with a first format of the first plurality of user-selectable formats, the first message object attributed to a first conversational entity;

display a second portion of the conversational interface editor on the client device to the user, the second portion including a second plurality of user-selectable formats for defining a second message object;

receive user interaction in the second portion that defines the second message object in association with a second format of the second plurality of user-selectable formats, the second message object attributed to a second conversational entity; and display a third portion of the conversational interface editor on the client device to the user, the third portion arranging the first message object and the second message object to depict a structure of a conversational interaction between the first conversational entity and the second conversational entity in a conversational interface responsive to receiving the user interaction in the first portion and the second portion.

14. The system of claim 13, wherein the instructions further cause the one or more processors to:
- receive user selection for designing a type of conversational interface; and
- responsive to receiving the user selection, generate the conversational interface editor for displaying on the client device to the user, the conversational interface editor matching the type of conversational interface selected for designing.

15. The system of claim 13, wherein the instructions further cause the one or more processors to:
- display a fourth portion of the conversational interface editor on the client device to the user, the fourth portion including a plurality of user-selectable graphical elements for interacting with a design of the conversational interface;
- receive user interaction in the fourth portion selecting a first user-selectable graphical element to request a preview of the conversational interaction; and
- responsive to receiving the user interaction in the fourth portion selecting the first user-selectable graphical element, preview a flow of the conversational interaction between the first conversational entity and the second conversational entity in the conversational interface depicted in the third portion.

16. The system of claim 15, wherein the instructions further cause the one or more processors to:
- receive user interaction in the fourth portion selecting a second user-selectable graphical element to request a visualization of the flow of the conversational interaction; and
- responsive to receiving the user interaction in the fourth portion selecting the second user-selectable graphical element, display a fifth portion of the conversational interface editor on the client device to the user, the fifth portion depicting the visualization.

17. The system of claim 13, wherein the instructions further cause the one or more processors to:
- receive user interaction in the third portion associated with creating a new path of the conversational interaction;
- display a sixth portion of the conversational interface editor on the client device to the user, the sixth portion depicting the new path of the conversational interaction responsive to receiving the user interaction in the first portion and the second portion; and
- automatically link the new path to a last message object of the first message object and the second message object in the third portion.

18. A computer program product comprising a non-transitory computer readable medium storing a computer readable program, wherein the computer readable program when executed on a computer causes the computer to:
- display a first portion of a conversational interface editor on a client device to a user, the first portion including a first plurality of user-selectable formats for defining a first message object;
- receive user interaction in the first portion that defines the first message object in association with a first format of the first plurality of user-selectable formats, the first message object attributed to a first conversational entity;
- display a second portion of the conversational interface editor on the client device to the user, the second portion including a second plurality of user-selectable formats for defining a second message object;
- receive user interaction in the second portion that defines the second message object in association with a second format of the second plurality of user-selectable formats, the second message object attributed to a second conversational entity; and
- display a third portion of the conversational interface editor on the client device to the user, the third portion arranging the first message object and the second message object to depict a structure of a conversational interaction between the first conversational entity and the second conversational entity in a conversational interface responsive to receiving the user interaction in the first portion and the second portion.

19. The computer program product of claim 18, wherein the computer readable program when executed on the computer further causes the computer to:
- display a fourth portion of the conversational interface editor on the client device to the user, the fourth portion including a plurality of user-selectable graphical elements for interacting with a design of the conversational interface;
- receive user interaction in the fourth portion selecting a first user-selectable graphical element to request a preview of the conversational interaction; and
- responsive to receiving the user interaction in the fourth portion selecting the first user-selectable graphical element, preview a flow of the conversational interaction between the first conversational entity and the second conversational entity in the conversational interface depicted in the third portion.

20. The computer program product of claim 18, wherein the computer readable program when executed on the computer further causes the computer to:
- receive user interaction in the third portion associated with creating a new path of the conversational interaction;
- display a sixth portion of the conversational interface editor on the client device to the user, the sixth portion depicting the new path of the conversational interaction responsive to receiving the user interaction in the first portion and the second portion; and
- automatically link the new path to a last message object of the first message object and the second message object in the third portion.

* * * * *